(12) United States Patent
Terashita et al.

(10) Patent No.: US 6,201,592 B1
(45) Date of Patent: Mar. 13, 2001

(54) LIQUID CRYSTAL DISPLAY DEVICE AND METHOD FOR PRODUCING THE SAME

(75) Inventors: Shinichi Terashita; Shuichi Kouzaki, both of Nara-ken (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/317,904

(22) Filed: May 25, 1999

(30) Foreign Application Priority Data

May 26, 1998 (JP) ............... 10-144842
Nov. 9, 1998 (JP) ............... 10-318200

(51) Int. Cl.[7] .................. G02F 1/1339
(52) U.S. Cl. ........................ 349/156
(58) Field of Search ................. 349/156

(56) References Cited

U.S. PATENT DOCUMENTS 6,118,510 * 9/2000 Bradshaw et al. ............ 349/156

FOREIGN PATENT DOCUMENTS

| 7-120728 | 5/1995 | (JP) . |
| 10-133206 | 5/1998 | (JP) . |
| 10-186330 | 7/1998 | (JP) . |

* cited by examiner

*Primary Examiner*—James A. Dudek
(74) *Attorney, Agent, or Firm*—Nixon & Vanderhye, P.C.

(57) ABSTRACT

A liquid crystal display device includes: a first substrate and a second substrate; a liquid crystal layer interposed between the first substrate and the second substrate, the liquid crystal layer comprising liquid crystal molecules having a negative dielectric anisotropy; a plurality of first convex members formed on the first substrate along a first direction; and a plurality of second convex members formed on the second substrate along a second direction which is different from the first direction, the plurality of first convex members partially overlapping the plurality of second convex members, the plurality of first convex members and the plurality of second convex members defining liquid crystal regions. Under an applied voltage, the liquid crystal molecules in each liquid crystal region are aligned in an axially symmetrical or radial orientation. In the absence of an applied voltage, the liquid crystal molecules in each liquid crystal region are aligned substantially perpendicularly to the first substrate and the second substrate.

19 Claims, 18 Drawing Sheets

Appears as black

LIQUID CRYSTAL DISPLAY DEVICE AND METHOD FOR PRODUCING THE SAME

BACKGROUND OF THE INVENTION

1. Field of the Invention

The present invention relates to a liquid crystal display (LCD) device and a method for producing the same. In particular, the present invention relates to an LCD device having broad viewing angle characteristics, and a method for producing the same.

2. Description of the Related Art

The inventors of the present invention have disclosed in Japanese Laid-Open Publication No. 7-120728 a display mode designated "ASM mode" (axially symmetric aligned microcell mode), in which liquid crystal molecules are allowed to be twisted across the interspace between a pair of substrates and yet be axially-symmetrically oriented within each pixel region.

This method amounts to a technique of aligning liquid crystal molecules in an axially symmetrical orientation by utilizing phase separation from a mixture of liquid crystal and a photocurable resin. This mode is a so-called normally-white mode, where the liquid crystal molecules in an axially symmetrical orientation are aligned along a normal direction of the substrates in response to an applied voltage.

This conventional ASM mode LCD device employs a liquid crystal material having a positive dielectric anisotropy $\Delta\epsilon$. Although this display mode provides excellent display characteristics in all directions because of the axially symmetrical orientation of liquid crystal molecules, it has a problem in that a black matrix having relatively large light-shielding portions must be employed in order to prevent the unwanted passage of light in the absence of an applied voltage. This has posed practical constraints on the upper limit of the aperture ratio. Furthermore, the conventional ASM mode utilizes a phase separation step, which requires complex temperature control to achieve an axially symmetrical orientation of liquid crystal molecules. In addition, it is difficult to produce a conventional ASM mode LCD device because it requires high-precision positioning of a pair of substrates, i.e., a color filter substrate and an active matrix substrate.

In view of the above problems, the inventors have proposed in Japanese Laid-Open Publication No. 8-341590 an ASM mode LCD device which is relatively easy to produce.

In accordance with the LCD device proposed in the 8-341590 application, the liquid crystal molecules within a liquid crystal layer interposed between a pair of substrates have a negative dielectric anisotropy (i.e., $\Delta\epsilon<0$), and a negative phase plate having refractive index anisotropy is provided on the inside of a pair of polarizing plates. In the absence of an applied voltage, the liquid crystal molecules are aligned generally perpendicularly with respect to the substrate plane, so that a black state is attained regardless of the viewing angle. Furthermore, since the liquid crystal molecules are aligned so as to be axially-symmetrical within each pixel region, this device functions so as to compensate for the retardation which the light outgoing from the liquid crystal layer in any oblique direction is subjected to in a TN (twisted nematic) LCD device.

However, the above-described conventional LCD device has a problem in that it provides a very gentle voltage-transmittance characteristic curve so that a high voltage is incurred at the time of saturation. As a result, it is difficult to drive the conventional LCD device with a low voltage, resulting in large power consumption.

The above-described conventional LCD device attains an excellent black state in the absence of an applied voltage regardless of the direction of observation, thereby providing viewing angle characteristics with an excellent contrast ratio. However, when an intermediate gray scale image displayed on the LCD device is observed in the direction of e.g., about 45° with respect to the absorption axis of a polarization plate, the contrast may greatly deteriorate, and the gray scale characteristics may even be inverted in a certain range of viewing angles (e.g., about 35° to about 50°) due to the retardation caused by the ASM liquid crystal cell and the characteristics of the polarization plate.

Moreover, in accordance with the LCD device proposed in the 8-341590 application, the step of attaching the pair of substrates to each other still requires highly precise positioning and use of plastic beads or the like for controlling the cell thickness, as in the case of other conventional LCD devices.

SUMMARY OF THE INVENTION

A liquid crystal display device according to the present invention includes: a first substrate and a second substrate; a liquid crystal layer interposed between the first substrate and the second substrate, the liquid crystal layer including liquid crystal molecules having a negative dielectric anisotropy; a plurality of first convex members formed on the first substrate along a first direction; and a plurality of second convex members formed on the second substrate along a second direction which is different from the first direction, the plurality of first convex members partially overlapping the plurality of second convex members, the plurality of first convex members and the plurality of second convex members defining liquid crystal regions, and, under an applied voltage, the liquid crystal molecules in each liquid crystal region are aligned in an axially symmetrical or radial orientation; and, in the absence of an applied voltage, the liquid crystal molecules in each liquid crystal region are aligned substantially perpendicularly to the first substrate and the second substrate.

In one embodiment of the invention, the plurality of first convex members and the plurality of second convex members are formed in continuous stripes.

In another embodiment of the invention, the plurality of first convex members and the plurality of second convex members are formed in disrupted stripes.

In still another embodiment of the invention, the liquid crystal layer has a thickness ($d_{in}$) within the liquid crystal regions and a thickness ($d_{out}$) in between or around the liquid crystal regions, the thickness ($d_{in}$) being larger than the thickness ($d_{out}$), and a vertical alignment layer is provided on a side of at least one of the first substrate and the second substrate facing the liquid crystal layer.

In still another embodiment of the invention, the plurality of first convex members have substantially the same height with one another, and the plurality of second convex members have substantially the same height with one another; and an interspace between the first substrate and the second substrate is retained by intersections between the plurality of first convex members and the plurality of second convex members.

In still another embodiment of the invention, no chiral dopant is mixed in the liquid crystal layer; and at least one convex member among the plurality of first convex members and the plurality of second convex members has a face tilted with respect to a direction perpendicular to the substrate plane.

In still another embodiment of the invention, a chiral dopant is mixed in the liquid crystal layer.

In still another embodiment of the invention, the liquid crystal molecules in the liquid crystal layer have twist angles in the range of about 80° to about 120°.

In still another embodiment of the invention, Δn×d is in the range of about 300 to about 550 nm, where Δn is a refractive index anisotropy of the liquid crystal molecules, and d is a thickness of the liquid crystal layer.

In still another embodiment of the invention, a first polarization plate is provided on a side of the first substrate opposite the side facing the liquid crystal layer, and a second polarization plate is provided on a side of the second substrate opposite the side facing the liquid crystal layer, the first polarization plate and the second polarization plate being placed in a crossed Nicol state; and a first phase plate is provided between the first polarization plate and the first substrate, the first phase plate having in-plane primary refractive indices nx and ny and a primary refractive index nz along a thickness direction, where nx, ny, and nz satisfy the relationship nx>ny>nz or the relationship nx=ny>nz.

In still another embodiment of the invention, a direction of the in-plane primary refractive index nx of the first phase plate is substantially perpendicular to an absorption axis of the first polarization plate.

In still another embodiment of the invention, a second phase plate is provided between the second polarization plate and the second substrate; and a direction of the in-plane primary refractive index nx of the first phase plate is substantially perpendicular to an absorption axis of the first polarization plate, and a direction of the in-plane primary refractive index nx of the second phase plate is substantially perpendicular to an absorption axis of the second polarization plate.

In still another embodiment of the invention, an alignment stabilization layer is further provided on the side of at least one of the first substrate and the second substrate facing the liquid crystal layer, the alignment stabilization layer imparting the liquid crystal molecules with pretilt angles for causing axially symmetrical or radial orientation of the liquid crystal molecules.

In still another embodiment of the invention, the alignment stabilization layer includes a photocurable resin.

In another aspect of the invention, there is provided a method for producing a liquid crystal display device, including the steps of: forming a plurality of first convex members on a first substrate along a first direction, a plurality of second convex members on a second substrate along a second direction which is different from the first direction, and a vertical alignment layer on a side of at least one of the first substrate and the second substrate facing the liquid crystal layer; attaching the first substrate and the second substrate to each other so that the plurality of first convex members partially overlap the plurality of second convex members; interposing a liquid crystal layer between the first substrate and the second substrate, the liquid crystal layer including liquid crystal molecules having a negative dielectric anisotropy; and aligning the liquid crystal molecules in liquid crystal regions defined by the plurality of first convex members and the plurality of second convex members in an axially symmetrical or radial orientation while applying a voltage which is equal to or greater than ½ of a threshold voltage of voltage-transmittance characteristics of the liquid crystal display device.

In one embodiment of the invention, the plurality of first convex members and the plurality of second convex members are formed in continuous stripes.

In another embodiment of the invention, the plurality of first convex members and the plurality of second convex members are formed in disrupted stripes.

In still another embodiment of the invention, the liquid crystal material includes a photocurable resin, the method further including the step of: curing the photocurable resin to form an alignment stabilization layer on a side of at least one of the first substrate and the second substrate facing the liquid crystal layer, the alignment stabilization layer imparting the liquid crystal molecules with pretilt angles for causing axially symmetrical or radial orientation of the liquid crystal molecules.

In still another embodiment of the invention, the step of interposing the liquid crystal material is performed by vacuum injection.

Below are the definitions of some of the terms which are used herein in connection with the configuration of convex members according to the present invention:

Convex members which are formed in "continuous stripes" are defined as convex members each of which constitutes one uninterrupted linear shape in the display region (i.e., a region in which a displayed image is observable to a viewer). Convex members which are formed in "disrupted stripes" are defined as convex members each of which consists of two or more segments in the display region arranged linearly with regular or irregular interspaces between the segments, rather than constituting an uninterrupted linear shape. It should be noted that one convex member, whether in the form of a continuous stripe or a disrupted stripe, refers to the entire row including two or more segments, rather than any single segment.

An "axially symmetrical orientation", as used herein, refers to a state in which liquid crystal molecules are aligned in an axially symmetrical manner around a central axis. Liquid crystal molecules which are in an "axially symmetrical orientation" may take a splay, twist, or bend orientation, for example. A "radial orientation", as used herein, refers to a state in which liquid crystal molecules are not twisted across the interspace between the upper and lower substrates of a liquid crystal cell. A "radial orientation" may or may not be centered around a central axis.

Throughout the present specification, the term "surround" is employed with a special connotation of "as seen from a direction perpendicular to the substrate plane". Hence, it will be appreciated that an area may appear as being "surrounded" by convex members on a two-dimensional plane, without actually being "enclosed" by the convex members in a three-dimensional manner. For example, a liquid crystal region may be defined by first and second convex members "surrounding" the liquid crystal region, without being enclosed by the convex members.

Hereinafter, the effects provided by the present invention will be described.

A liquid crystal display device according to the present invention includes a plurality of first convex members formed on the first substrate along a first direction, and a plurality of second convex members formed on the second substrate along a second direction which is different from the first direction, the plurality of first convex members partially overlapping the plurality of second convex members. The plurality of first convex members and the plurality of second convex members define liquid crystal regions. Since such liquid crystal regions are not completely enclosed by the first and second convex members, a conventional vacuum injection method can be employed to inject a liquid crystal material into the cell, thereby reducing the complexity of the production steps. Since the attachment of the substrates to each other does not require high-precision positioning of the substrates, the manufacture process is simplified.

The plurality of first convex members and the plurality of second convex members may both be formed in continuous stripes. Alternatively, at least one of the first or second convex members may be formed in disrupted stripes.

In the absence of an applied voltage, liquid crystal molecules having a negative dielectric anisotropy are aligned along a direction perpendicular to the substrate plane due to the action of a vertical alignment layer. A dark field will be observed in each pixel region by using a polarization microscope placed in a crossed Nicol state (normally black mode). When a voltage is applied, the liquid crystal molecules having a negative dielectric anisotropy receive a force to cause the longitudinal axes of the liquid crystal molecules to be aligned along a direction perpendicular to the direction of the applied electric field. As a result, the liquid crystal molecules are tilted from a direction perpendicular to the substrates (so that an intermediate gray scale tone is displayed). In this state, an extinction pattern extending along the polarization axes will be observed in the pixel region by using a polarization microscope placed in a crossed Nicol state. Since the liquid crystal molecules are aligned in a concentric manner or along multiple (e.g., three or more) axes in each liquid crystal region defined by the plurality of first convex members and the plurality of second convex members, due to the action of the plurality of first convex members and the plurality of second convex members and/or the vertical alignment layer, an axially symmetrical or radial orientation is obtained. Since liquid crystal regions can be obtained which are capable of switching between a vertical orientation and an axially symmetrical or radial orientation responsive to an applied voltage, the change in contrast and/or the inversion phenomenon are substantially eliminated, so that excellent viewing angle characteristics are achieved in an omnidirectional manner, with excellent symmetry with respect to the frontal direction of the device. A high contrast level is attained because a liquid crystal material having a negative dielectric anisotropy is employed for achieving display in a normally black mode where the liquid crystal molecules take a vertical alignment in the absence of an applied voltage.

As shown in FIGS. 1A and 1B (described later), continuous stripe walls (first convex members 36a and second convex members 36b) are formed on the first substrate and the second substrate, respectively, so that the liquid crystal regions defined by the convex members will exhibit an axially symmetrical or radial orientation under an applied voltage. By providing the convex members so as to extend in between or around the liquid crystal regions in accordance with the configuration of a black matrix (which define a light-shielding region), the decrease in transmittance due to a reduced aperture ratio can be prevented. As a result, a transmittance level which is equivalent to that of a TN (twisted nematic LCD device) can be maintained.

In the case where plasma partitions (light-shielding stripe ribs) are provided as in the case of a PALC (plasma address liquid crystal) substrate, or in the case where light-shielding portions (e.g., metal wiring of TFT bus lines) of a TFT (thin film transistor) substrate and the black matrix on a counter CF (color filter) substrate are formed in continuous stripes, it is easy to selectively form continuous stripe wall structures in the light-shielding portions by employing a positive type photosensitive resin material while utilizing such a substrate as a mask.

In a conventional structure in which convex members are not formed on either substrate, the liquid crystal layer have a uniform thickness or cell gap across its area, so that the positions and/or size of the liquid crystal regions are indefinite; as a result, the liquid crystal molecules may take random orientation. According to the present invention, however, the liquid crystal layer can have a thickness ($d_{in}$) within the liquid crystal regions and a thickness ($d_{out}$) in between or around the liquid crystal regions such that the thickness ($d_{in}$) is larger than the thickness ($d_{out}$). By controlling the thickness of the liquid crystal layer in this manner, the interaction between liquid crystal molecules in different or adjoining liquid crystal regions can be reduced, so that a single liquid crystal region of axially symmetrical or radial orientation emerges in each pixel region. By providing a vertical alignment layer on the side of at least one of the substrates that faces the liquid crystal layer, the liquid crystal molecules will have a vertical alignment with respect to the substrate plane in the absence of an applied voltage, so that disclination lines emerging under an applied voltage in a normal black mode will appear as black lines. As a result, the deterioration of the contrast characteristics is prevented. Since the vertical alignment layer does not require a rubbing treatment, the contamination of the substrates is also prevented.

In the case where the substrates are attached together so that the plurality of first convex members and the plurality of second convex members intersect each other at at least one point, the at least one intersection can function as a cell thickness retainer by further ensuring that the plurality of first convex members have substantially the same height with one another and that the plurality of second convex members have substantially the same height with one another. As a result, it becomes possible to obtain a desired cell thickness by thus controlling the heights of the first convex members and the second convex members, without the need to employ separate cell thickness control members such as plastic beads.

In the case where no chiral dopant is mixed in an n-type liquid crystal material, the liquid crystal molecules are aligned perpendicularly with respect to the substrate plane in the absence of an applied voltage, and gradually tilted as a higher voltage is applied. The directions in which the liquid crystal molecules are tilted are affected by their pretilt angles. In order to provide a degree of pretilt which is sufficient to cause the liquid crystal molecules to be tilted from a direction perpendicular to the substrate plane under an applied voltage, it is preferable that at least one of the plurality of first convex members and the plurality of second convex members are tilted from the normal direction of the substrates. For example, it is preferable that the first and second convex members have a tapered face so as to have a trapezoidal, semicircular, or triangular cross section. Pretilt angles are imparted to the liquid crystal molecules present on such tapered faces, which come in contact with the liquid crystal layer, such that the liquid crystal molecules have an angle smaller than 90° with respect to the substrate plane in accordance with the direction of slant of the convex members, as shown in FIG. 6 (described later). Thus, the directions in which the liquid crystal molecules are tilted under an applied voltage can be controlled so that light leakage in a normally black mode is prevented.

In the case where each liquid crystal region defined by the first convex members and the second convex members on the first and second substrates, liquid crystal molecules are tilted toward the center of each liquid crystal region away from the convex members adjacent to that liquid crystal region, while retaining a vertical alignment in the central portion of the liquid crystal region. As a result, an axially symmetrical or radial orientation can be substantially obtained. The display appears the brightest when, under an applied voltage, polarization plates held in a crossed Nicol state are placed with their absorption axes being angled at about 45° with respect to the convex members surrounding the liquid crystal regions. As shown in FIG. 7 (described later), an extinction pattern appears which is in parallel to diagonals between intersections of the continuous stripes of convex members (or disrupted stripes of convex members) and substantially centered around the center of each liquid crystal region. On the other hand, the display appears the darkest when, under an applied voltage, polarization plates held in a crossed Nicol state are placed with their absorption axes being angled in parallel to or at 90° with respect to the continuous stripes of convex members (or disrupted stripes of convex members) surrounding the liquid crystal regions. In this state, as shown in FIG. 8 (described later), an extinction pattern appears whose white and black portions are reversed from those of the extinction pattern which appears in the case where the polarization plates are placed with their absorption axes being angled at about 45° with respect to the continuous stripes of convex members (or disrupted stripes of convex members).

This liquid crystal display mode, which does not utilize any chiral dopant in the liquid crystal material, is a birefringence mode which utilizes the refractive index anisotropy of liquid crystal molecules, rather than optical rotation principles as in the case of a TN display mode. Accordingly, steep voltage-transmittance characteristics are provided, thereby enabling low voltage driving while providing broad viewing angle characteristics.

In the case where a chiral dopant is mixed in an n-type liquid crystal material, the liquid crystal molecules are twisted across the interspace between the pair of substrates under an applied voltage. As a result, an ASM orientation is achieved due to the interaction of the first and second convex members defining liquid crystal regions and the chiral dopant. Accordingly, the brightness of the display as observed in the frontal direction with polarization plates being placed in a crossed Nicol state remains substantially constant regardless of the directions of the absorption axes of the polarization plates.

Although utilizing optical rotation principles, the ASM mode provides voltage-transmittance characteristics having a gentler slope than that provided by the TN display mode. However, when a chiral dopant is mixed in the liquid crystal material, the display can function by principles similar to those of the TN mode. As a result, steep voltage-transmittance characteristics are achieved depending on the K11(splay)/K13(bend) ratio of elastic constants of the liquid crystal.

By prescribing a certain range of twist angles for the liquid crystal molecules and prescribing a certain range of a retardation value $\Delta n \times d$, where $\Delta n$ is the refractive index anisotropy of the liquid crystal molecules, and d is the thickness of the liquid crystal layer (i.e., the cell thickness), a high contrast level can be provided without unwanted coloration of transmitted light. In the ASM mode, the liquid crystal molecules take an axially symmetrical orientation. Due to birefringence effects, the optical characteristics (e.g., voltage-transmittance characteristics) in a range of twist angles from about 80° to about 120° become available for display. It is preferable that the twist angles of the liquid crystal molecules are in this range of about 80° to about 120° because, as shown in FIG. 18 (described later), the viewing angle characteristics and/or voltage-transmittance characteristics and color characteristics provide excellent symmetry, in an omnidirectional manner, within such a range of twist angles.

It is preferable that the retardation value $\Delta n \times d$ is in the range of about 300 nm to 550 nm because the transmittance under an applied voltage, and the viewing angle characteristics in the absence of an applied voltage, become excellent in this range, while preventing a so-called gray-scale inversion (or contrast inversion) phenomenon (i.e., inversion of the relationship between the applied voltage and the transmittance depending on the viewing angle).

In an ASM liquid crystal display mode where a chiral dopant is mixed in a liquid crystal having a negative dielectric anisotropy, the schlieren extinction pattern will rotate around its central axis as the absorption axes of polarization plates held in a crossed Nicol state are rotated, so that the transmittance in the frontal direction under an applied voltage hardly changes. On the other hand, in a liquid crystal display mode where no chiral dopant is mixed, the viewing angle characteristics in a direction which is about 45° from the direction of the absorption axes of polarization plates held in a crossed Nicol state may be somewhat deteriorated.

Accordingly, it is preferable to compensate for the viewing angle characteristics by providing first and second polarization plates in a crossed Nicol state so as to interpose a pair of substrates and provide a first phase plate (i.e., a phase difference compensation device), for example between the first polarization plate and the adjoining first substrate, the first phase plate having in-plane primary refractive indices nx and ny and a primary refractive index nz along a thickness direction, where nx, ny, and nz satisfy the relationship nx>ny>nz or the relationship nx=ny>nz. Specifically, in an orthogonal coordinate system whose x-y plane corresponds to the surface of the phase plate, where the phase plate has an index ellipsoid having three primary refractive indices nx, ny, and nz such that nz is the smallest, the refractive indices nx and ny are orthogonal to each other on the x-y plane. As a result, the viewing angle dependency due to the characteristics of the polarization plate itself and the viewing angle dependency of the retardation value of the liquid crystal layer are compensated for. Consequently, the viewing angle characteristics in a direction which is about 45° from the direction of the absorption axes of polarization plates held in a crossed Nicol state are greatly improved.

As shown in FIGS. 9A to 9C (described later), the first phase plate, when disposed so that the direction of the primary refractive index nx (slower axis) is substantially perpendicular to an absorption axis of a polarization plate adjoining the phase plate, greatly improves the viewing angle characteristics in a direction which is about 45° from the direction of the absorption axes of polarization plates held in a crossed Nicol state. Such a first phase plate may be a single phase difference compensation film, or a number of phase difference compensation films laminated with their optic axes oriented in different directions.

Furthermore, in addition to the first phase plate, by providing a second phase plate between the second polarization plate and the second substrate so that the direction of the in-plane primary refractive index nx of the first phase plate is substantially perpendicular to the absorption axis of the adjoining first polarization plate, and that the direction of the in-plane primary refractive index nx of the second phase plate is substantially perpendicular to the absorption axis of the adjoining second polarization plate, the compensation effects for the viewing angle characteristics in a direction which is about 45° from the direction of the absorption axes of polarization plates held in a crossed Nicol state can be optimized.

The orientation (which is substantially perpendicular to the substrate plane) of liquid crystal molecules in the absence of an applied voltage is controlled by the vertical alignment film. However, without performing a rubbing treatment, it may be difficult to obtain a stable axially symmetrical or radial orientation at the time of, for example, instantaneously switching a voltage between ON and OFF states. Therefore, it is preferable to provide an alignment stabilization layer on the side of at least one of the substrates that faces the liquid crystal layer for a stable orientation at the time of such switching of the applied voltage.

By mixing a photocurable resin in the liquid crystal material, it becomes possible to easily obtain an alignment stabilization layer by curing the photocurable resin via external light irradiation.

The liquid crystal display device according to the present invention can be produced by: forming a plurality of first convex members on a first substrate along a first direction, a plurality of second convex members on a second substrate along a second direction which is different from the first direction, and a vertical alignment layer on a side of at least one of the first substrate and the second substrate facing the liquid crystal layer; attaching the first substrate and the second substrate to each other so that the plurality of first convex members partially overlap the plurality of second convex members; interposing a liquid crystal layer between the first substrate and the second substrate, the liquid crystal layer including liquid crystal molecules having a negative dielectric anisotropy: and aligning the liquid crystal molecules in liquid crystal regions defined by the plurality of first convex members and the plurality of second convex members in an axially symmetrical or radial orientation while applying a voltage which is equal to or greater than ½ of a threshold voltage of electrooptical characteristics of the liquid crystal display device. Thus, it is possible to ensure that liquid crystal molecules take a uniform and stable axially symmetrical or radial orientation within each liquid crystal region defined by the plurality of first convex members and the plurality of second convex members. By providing a vertical alignment layer on the side of at least one of the substrates that faces the liquid crystal layer, it becomes possible to align the liquid crystal molecules perpendicularly with respect to the substrate plane.

By providing tapered faces on the convex members, the liquid crystal molecules will be tilted in accordance with the direction of the taper, thereby facilitating the formation of an axially symmetrical or radial orientation. For example, it is preferable that convex members have a tapered face so as to have a trapezoidal, semicircular, or triangular cross section.

By ensuring that the plurality of first convex members and the plurality of second convex members are formed in continuous stripes, and that the first substrate and the second substrate are attached to each other so that the plurality of first convex members and the plurality of second convex members intersect each other, liquid crystal regions are obtained whose four sides are defined by the convex members. Alternatively, by ensuring that the plurality of first convex members and the plurality of second convex members are formed in disrupted stripes, and that the first substrate and the second substrate are attached to each other so that the plurality of first convex members and the plurality of second convex members intersect each other at at least one point, liquid crystal regions are obtained which are defined by a latticework of convex members having openings at the corners or having disrupted sides. In accordance with such an LCD device, the attachment of the substrates to each other does not require high-precision positioning of the substrates, thereby simplifying the manufacture process. Since the pixel regions thus-defined are not completely enclosed by the first convex members and the second convex members, a conventional vacuum injection method can be employed to inject a liquid crystal material into the cell.

By mixing a photocurable resin in the liquid crystal material, it becomes possible to easily obtain an alignment stabilization layer on the side of at least one of the first and second substrates that faces the liquid crystal layer by curing the photocurable resin via external light irradiation. Such an alignment stabilization layer imparts the liquid crystal molecules with axially symmetrical or radial pretilt angles.

Thus, the invention described herein makes possible the advantages of (1) providing a LCD device which is easy to produce and provides broad viewing angle characteristics; and (2) providing a method for producing the same.

These and other advantages of the present invention will become apparent to those skilled in the art upon reading and understanding the following detailed description with reference to the accompanying figures.

BRIEF DESCRIPTION OF THE DRAWINGS

FIGS. 3A and 3C are cross-sectional views showing the LCD device 100, and FIGS. 3B and 3D are plan views showing the LCD device 100 as observed with a polarization microscope placed in a crossed Nicol state; FIGS. 3A and 3B each illustrate a state where no voltage is applied; FIGS. 3C and 3D each illustrate a state where a voltage is applied.

DESCRIPTION OF THE PREFERRED EMBODIMENTS

Hereinafter, the present invention will be described with reference to the accompanying figures.

(Fundamental Operation Principles)

First, the operation principles of an LCD device 100 according to the present invention will be described with reference to FIGS. 1A, 1B, 2A, 2B, and 3A to 3D.

Figure 1A:
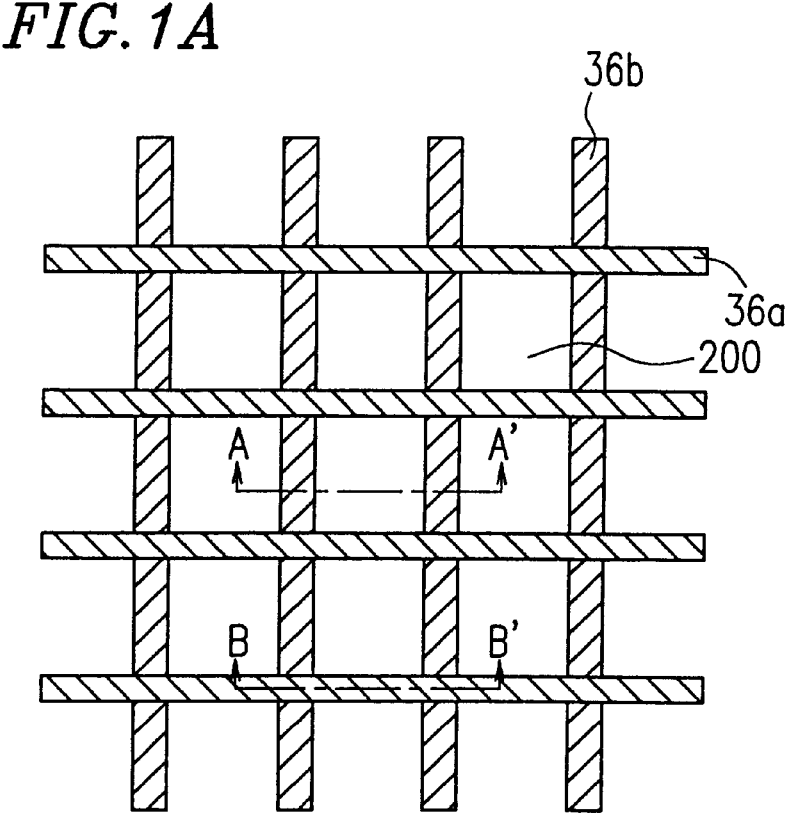
FIG. 1A is a plan view showing continuous stripes of convex members in an LCD device according to the present invention.
Figure 1B:
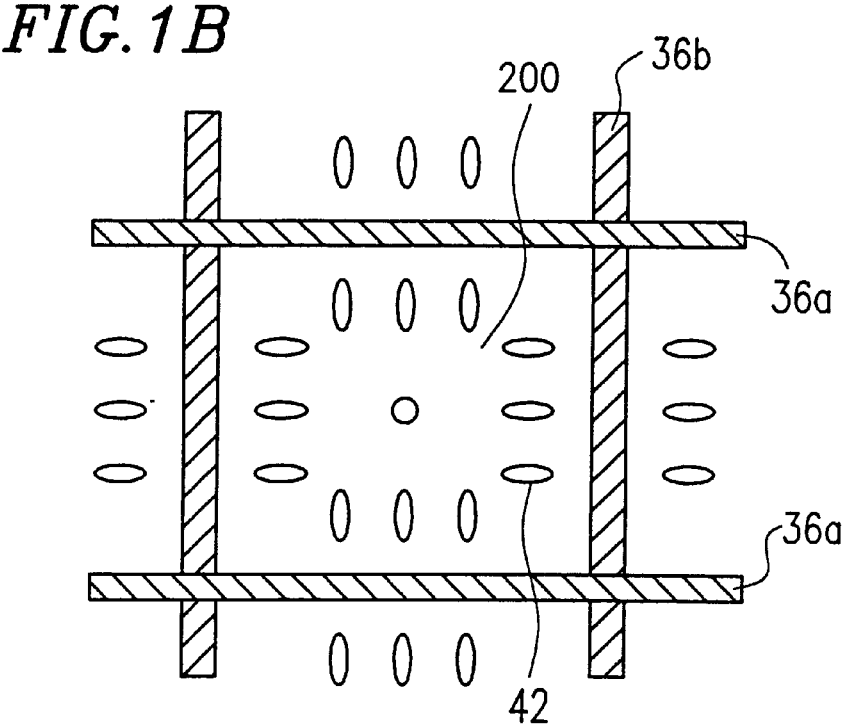
FIG. 1B is an enlarged plan view showing a pixel region shown in FIG. 1A.
Figure 2A:
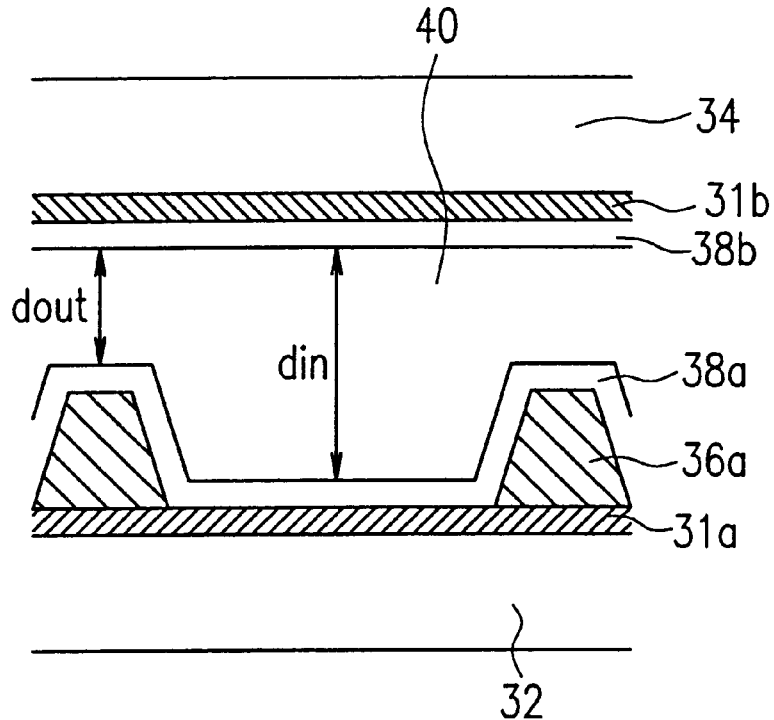
FIG. 2A is a cross-sectional view taken along line A–A' in FIG. 1A.
Figure 2B:
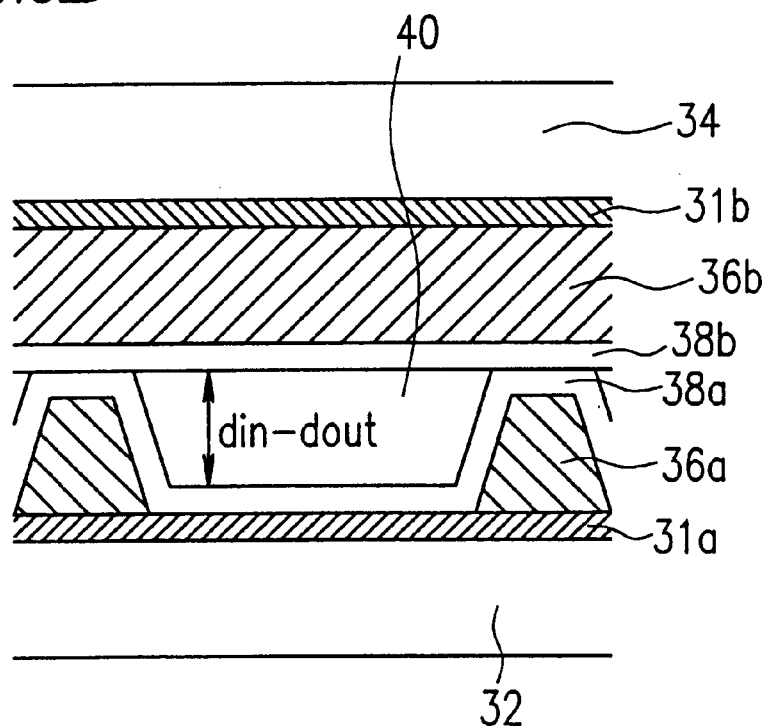
FIG. 2B is a cross-sectional view taken along line B–B' in FIG. 1A.
Figure 3A:
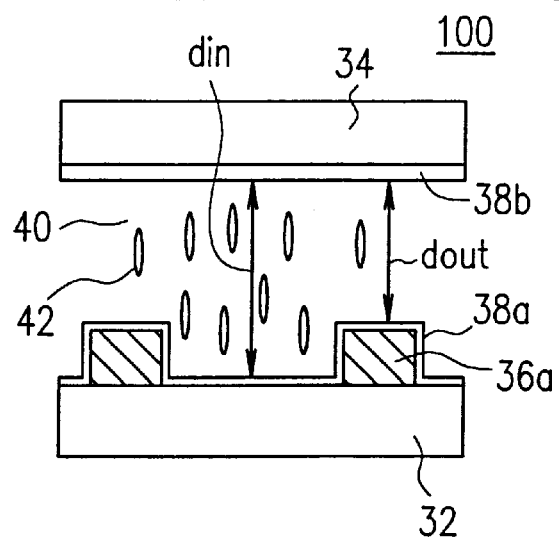
FIGS. 3A to 3D are diagrams illustrating the operation principles of an LCD device 100 according to the present invention.
Figure 3C:
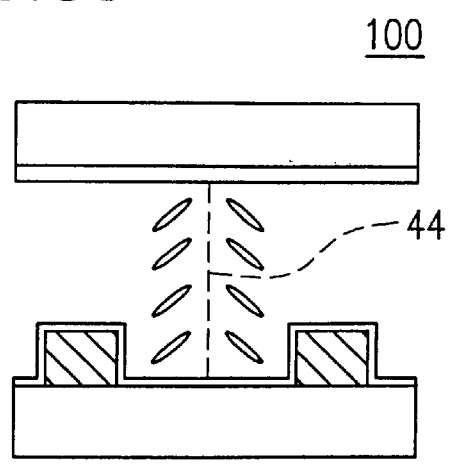
Figure 3B:
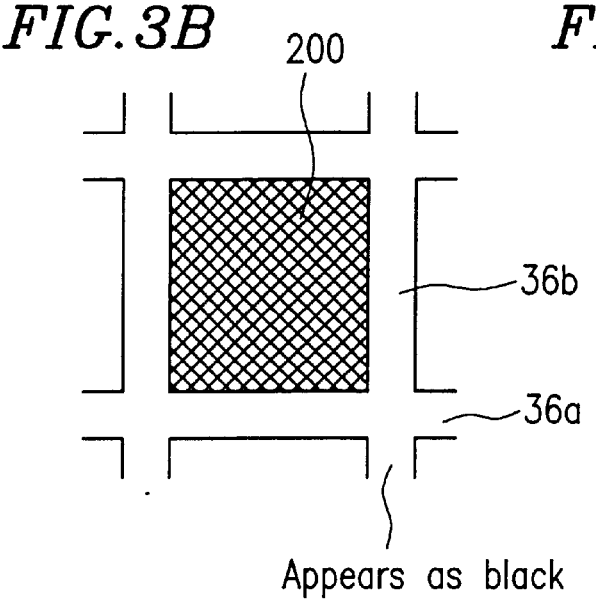
Figure 3D:
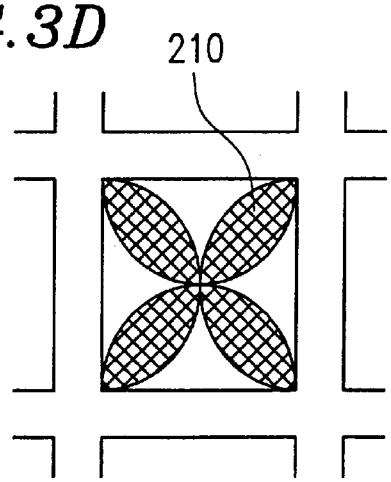

FIG. 1A is a plan view showing continuous stripe wall structures provided in the LCD device 100 of the present invention. FIG. 1B is an enlarged plan view showing a pixel region 200 in FIG. 1A. FIG. 2A is a cross-sectional view taken along line A–A' in FIG. 1A. FIG. 2B is a cross-sectional view taken along line B–B' in FIG. 1A. FIGS. 3A and 3C are cross-sectional views showing the LCD device 100; FIGS. 3B and 3D are plan views showing the LCD device 100 as observed with a polarization microscope placed in a crossed Nicol state. FIGS. 3A and 3B each illustrate a state where no voltage is applied; FIGS. 3C and 3D each illustrate a state where a voltage is applied.

The LCD device 100 of the present invention includes a pair of substrates (made of glass or like), i.e., a first substrate 32 and a second substrate 34; and a liquid crystal layer 40 interposed therebetween. The liquid crystal layer 40 contains liquid crystal molecules 42 having a negative (n-type) dielectric anisotropy $\Delta\epsilon$. On the side of the first substrate 32 facing the liquid crystal layer 40, first convex members 36a are formed along a first direction, on which a vertical alignment layer 38a is formed. On the side of the second substrate 34 facing the liquid crystal layer 40, second convex members 36b are formed along a second direction, on which a vertical alignment layer 38b is formed. The first direction and the second direction are different from each other. As shown in FIGS. 1A and 1B and FIGS. 2A and 2B, the convex members 36a and 36b are provided in the form of two sets of continuous stripes extending around respective pixel regions 200. Specifically, as seen from a direction perpendicular to the substrates 32 and 34, a pair of adjoining convex members 36a on the first (i.e., lower) substrate 32 and a pair of adjoining convex members 36b on the second (i.e., upper) substrate 34 intersect one another so as to surround one pixel region 200. Thus, the convex members 36a and 36b form a latticework of wall structures.

FIGS. 1A, 1B, 2A, 2B, and 3A to 3D illustrate a case where one liquid crystal region is formed corresponding to one pixel region. Specifically, the convex members 36a and 36b are provided so as to substantially surround pixel regions. As a result, liquid crystal regions are formed so as to correspond to the respective pixel regions.

Owing to such arrangement of the first and second convex members 36a and 36b, the liquid crystal layer 40 has two different thicknesses $d_{out}$ and $d_{in}$ (FIG. 2A). As a result, a liquid crystal region 200 is defined in each portion surrounded (as seen from a direction perpendicular to the substrates 32 and 34) by the first and second convex members 36a and 36b such that the liquid crystal molecules within each liquid crystal region 200 exhibit an axially symmetrical or radial orientation with an applied voltage, as described later. In FIGS. 3A to 3D, the electrodes formed on the pair of substrates 32 and 34 for applying a voltage across the liquid crystal layer 40 are omitted. Although the first and second convex members 36a and 36b are illustrated to have a rectangular cross section in FIGS. 3A and 3C, it is preferable that the first and second convex members 36a and 36b have a trapezoidal, semicircular, or triangular cross section as shown in FIGS. 2A and 2B for stabilization of the liquid crystal orientation, irrespective of whether or not a chiral dopant is mixed in the liquid crystal layer 40 (described later).

In the absence of an applied voltage, as shown in FIG. 3A, the liquid crystal molecules 42 are aligned along a direction perpendicular to the first and second substrates 32 and 34 due to the alignment force provided from the vertical alignment layers 38a and 38b. FIG. 3B shows a dark field which is observed in the pixel region 200 by using a polarization microscope placed in a crossed Nicol state when no voltage is applied (normally black mode).

When a voltage is applied, the liquid crystal molecules 42 having a negative dielectric anisotropy receive a force to cause the longitudinal axes of the liquid crystal molecules 42 to be aligned along a direction perpendicular to the direction of the applied electric field. As a result, as shown in FIG. 3C, the liquid crystal molecules 42 are tilted from a direction perpendicular to the substrates 32 and 34 (so that an intermediate gray scale tone is displayed). FIG. 3D shows an extinction pattern extending along the polarization axes, which can be observed in the pixel region 200 in this state by using a polarization microscope placed in a crossed Nicol state.

Figure 4:
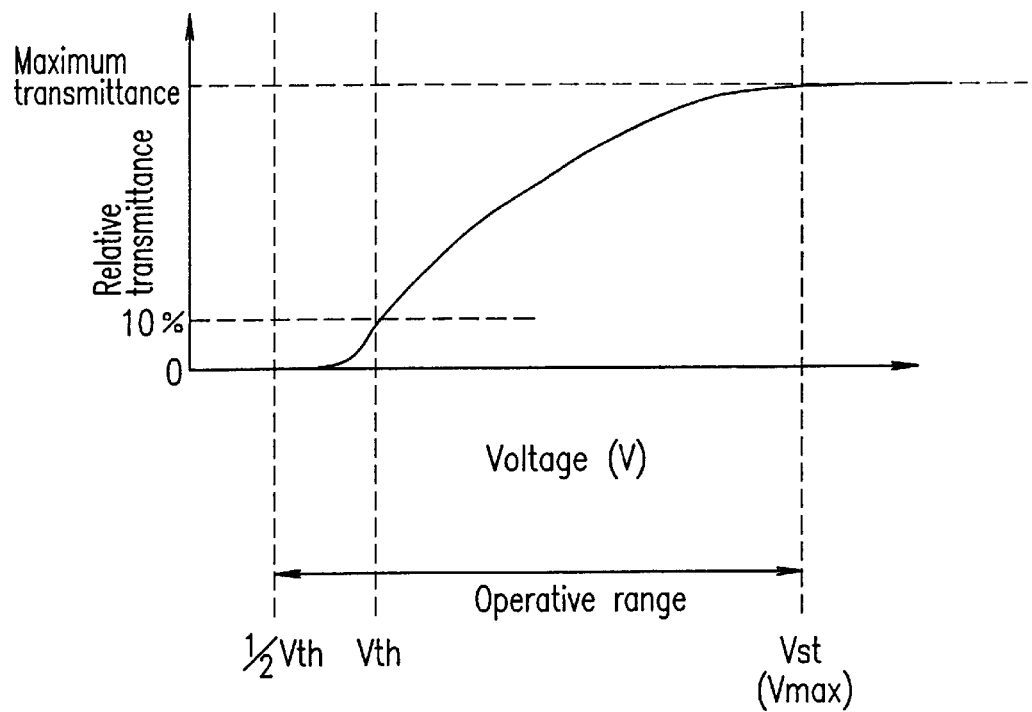
FIG. 4 is a graph illustrating an exemplary voltage-transmittance curve of an LCD device according to the present invention.

FIG. 4 illustrates a voltage-transmittance curve of the LCD device 100 according to the present invention, where the axis of abscissas represents the voltage applied across the liquid crystal layer and the axis of ordinates represents relative transmittance.

In accordance with the LCD device 100 of the present invention, it is preferable that the liquid crystal molecules take an axially symmetrical orientation with respect to one central axis per liquid crystal region. It is preferable to perform an axially symmetrical alignment process in order to ensure that one central axis is created in each liquid crystal region for the following reasons.

Mere injection of a liquid crystal material may result in the creation of more than one central axis within the liquid crystal region, and hence more than one region of axially symmetrical orientation within one liquid crystal region. If a plurality of central axes are created within one liquid crystal region, the voltage-transmittance curve shown in FIG. 4 may show hysteresis characteristics, i.e., the same applied voltage may result in different transmittance values depending on whether the voltage is on an ascending slope or a descending slope. However, applying a voltage to a liquid crystal cell in which a liquid crystal material has been merely injected and increasing the applied voltage causes the following change: a plurality of central axes may be created at first, but as the application of a voltage is continued which is equal to or greater than a half of a threshold voltage $V_{th}$ (i.e., a voltage which provides a relative transmittance of 10%), the plurality of central axes eventually become unified as one axis per liquid crystal region which is defined by the first and second convex members 36a and 36b. Accordingly, it is preferable to perform a symmetrical alignment process by applying a voltage which is equal to or greater than $\frac{1}{2}V_{th}$. Furthermore, it is preferable to drive the LCD device 100 of the present invention with a voltage in the range from a value which is equal to or greater than $\frac{1}{2}V_{th}$ to a saturation voltage $V_{st}$ (i.e., a voltage which provides the maximum transmittance). If the driving voltage is below $\frac{1}{2}V_{th}$, a plurality of central axes may be created, thereby causing unevenness in the displayed image and hence resulting in degraded display quality.

However, by forming an alignment stabilization layer (described later), it becomes possible to obtain an axially symmetrical or radial orientation with high reproducibility, even after terminating the application of a voltage which is equal to or greater than $\frac{1}{2}V_{th}$.

As used herein, the term "pixel region" is employed with the following meaning: The LCD device of the present invention includes a plurality of pixel regions for performing a display function. A pixel region is defined as a portion (component element) of the LCD device which composes a pixel, which in turn defines a minimum display unit. For example, in an active matrix type LCD device incorporating a counter electrode and a plurality of pixel electrodes which are arranged in a matrix so as to be each switched by respective active elements (e.g., TFTs or thin film transistors), each pixel region typically includes a corresponding pixel electrode; an opposing portion of the counter electrode; and a liquid crystal region interposed therebetween. In a simple matrix type LCD device including stripes of electrodes (scanning electrodes and signal electrodes) provided on corresponding substrates so as to intersect one another with a liquid crystal layer interposed therebetween, a pixel region typically includes a region corresponding to each intersection of the stripe electrodes and a liquid crystal region located at such an intersection.

The correspondence between the pixel regions and the liquid crystal regions is not limited to a one-to-one correspondence, i.e., one pixel region corresponding to one liquid crystal region. However, for the sake of improved display quality, it is preferable that a liquid crystal region is formed so as to correspond to each pixel region. In the case of elongated pixels (having a large aspect ratio), a plurality of liquid crystal regions may be formed corresponding to one elongated pixel. It is preferable to minimize the number of liquid crystal regions corresponding to one pixel so that an axially symmetrical orientation can be provided.

(Liquid Crystal Material)

The liquid crystal material which is used in the present invention is a liquid crystal material of a so-called n-type, having a negative dielectric anisotropy (i.e., $\Delta\epsilon<0$). The absolute value of $\Delta\epsilon$ of such a liquid crystal material can be selected according to the specific application. In general, however, the absolute value of $\Delta\epsilon$ of such a liquid crystal material is preferably large so as to reduce the driving voltage.

Retardation ($=d\cdot\Delta n$) under an applied voltage is an important factor that governs the essential characteristics of a LCD device, e.g., transmittance, viewing angle characteristics, and the like. In accordance with the display mode of the present invention utilizing an axially symmetrical or radial orientation, it is unnecessary to employ the optimum value of the inherent retardation of the liquid crystal cell, where inherent retardation is defined as a product of the inherent $\Delta n$ of the liquid crystal material and the average thickness of the liquid crystal layer.

Figure 5:
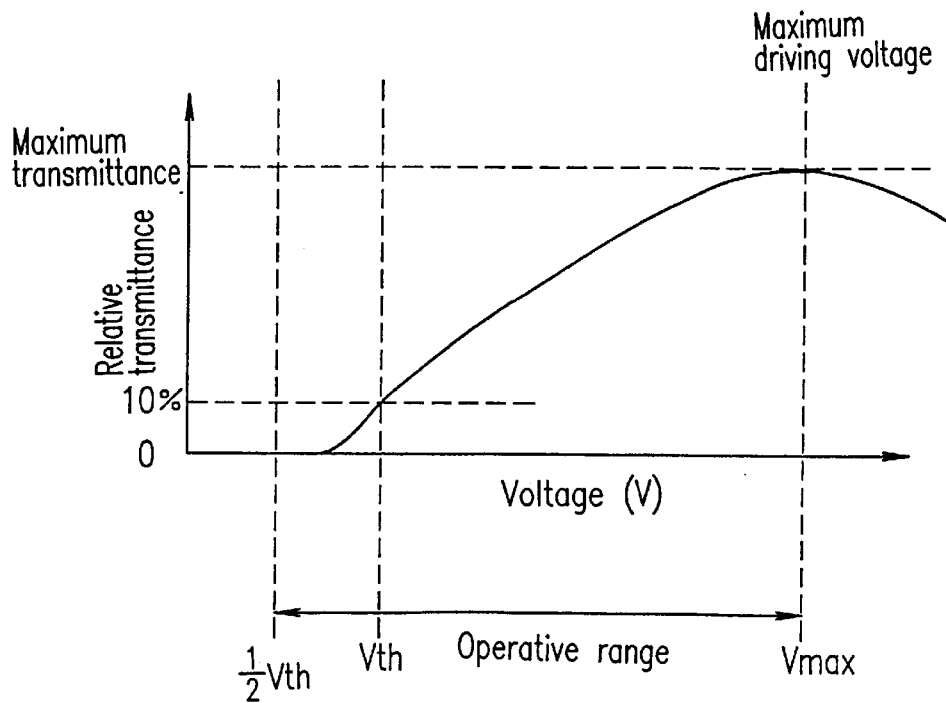
FIG. 5 is a graph illustrating another exemplary voltage-transmittance curve of an LCD device according to the present invention.

FIG. 5 illustrates a voltage-transmittance curve of an LCD device which provides a retardation larger than the optimum retardation value (i.e., the first minimum conditions for achieving maximum transmittance: $d\cdot\Delta n=550$ nm).

In the case of an LCD device having the voltage-transmittance characteristics illustrated in FIG. 5, the region above the maximum value of the relative transmittance is of no use for display functions. Therefore, the LCD device can be suitably driven in the region where the relative transmittance monotonously increases. In FIG. 5, the voltage which provides the maximum relative transmittance is defined as the maximum driving voltage ($V_{max}$).

The retardation at the maximum driving voltage during use is an important parameter of the LCD device according to the present invention. A preferable range of retardation ($=d\cdot\Delta n$) is about 300 nm to about 550 nm, where $\Delta n$ is the apparent anisotropy of refractive index of the liquid crystal molecules at the maximum driving voltage and d is the average thickness of the liquid crystal layer in a completed liquid crystal cell. Within the above range, it is possible to obtain excellent transmittance under an applied voltage and excellent viewing angle characteristics in the absence of an applied voltage, free from a so-called gray-scale inversion (or contrast inversion) phenomenon where the relationship between the applied voltage and the transmittance is inverted depending on the viewing angle.

Although the transmittance becomes maximal also under the second minimum conditions (retardation: about 1000 to about 1400 nm), such conditions are not preferable because of inferior viewing angle characteristics in the absence of an applied voltage and a possible gray-scale inversion (or contrast inversion) phenomenon.

In the case where a liquid crystal layer containing a chiral dopant is used, the twist angle of the liquid crystal molecules is another important factor that governs the transmittance of the LCD device. In the present invention, the twist angle at the maximum driving voltage is as important as the retardation value.

Since n-type liquid crystal molecules are employed in the present invention, the apparent twist angle of liquid crystal molecules have voltage dependency. The apparent twist angle in the absence of an applied voltage is substantially 0°, and the twist angle increases as the applied voltage increases; under a sufficiently high voltage, the twist angle approaches the inherent twist angle of the liquid crystal material. Since the liquid crystal molecules take an axially symmetrical orientation under the ASM mode, the twist angle at the maximum driving voltage is preferably in the range of about 80° to about 120°, and more preferably 90°, because such a range provides excellent optical characteristics, e.g., voltage-transmittance characteristics, due to birefringence effects.

It is preferable that both the twist angle at the maximum driving voltage and the retardation value are in their preferable ranges, in which case the transmittance can be more effectively brought up to its maximum value.

(Convex Members Defining Liquid Crystal Regions)

Referring back to FIGS. 1A, 1B, 2A, and 2B, in accordance with the LCD device 100 of the present invention, as seen from a direction perpendicular to the substrates 32 and 34, two adjoining convex members 36a on the first (i.e., lower) substrate 32 and two adjoining convex members 36b on the second (i.e., upper) substrate 34 intersect one another so as to surround one pixel region 200. Thus, the convex members 36a and 36b form a latticework of wall structures.

In a conventional structure where the first and second convex members 36a and 36b are not provided, the liquid crystal layer 40, hence having a uniform thickness or cell gap, a random orientation will result because the positions or size of liquid crystal domains (regions containing continuously aligned liquid crystal molecules, or regions where no disclination lines occur) become indefinite. As a result, intermediate gray scale images may appear somewhat uneven.

By forming the first and second convex members 36a and 36b, it becomes possible to define the positions and size of liquid crystal regions having an axially symmetrical or radial orientation.

As shown in FIGS. 2A and 2B, the first and second convex members 36a and 36b control the thickness of the liquid crystal layer 40 so as to reduce the interaction between liquid crystal molecules in different or adjoining pixel regions.

It is preferable that the liquid crystal layer 40 has a thickness ($d_{in}$) in the pixel regions (i.e., aperture regions) and a thickness ($d_{out}$) in between or around the pixel regions such that $d_{in} > d_{out}$. It is preferable that $0.2 \times d_{in} \leq d_{out} \leq 0.8 \times d$. The reason is that, if $0.2 \times d_{in} > d_{out}$, the interaction between liquid crystal molecules in different or adjoining pixel regions may not be sufficiently reduced so that it may be difficult to form a single region of axially symmetrical or radial orientation per pixel region; on the other hand, if $d_{out} < 0.8 \times d_{in}$, it maybe difficult to inject the liquid crystal material into the liquid crystal cell.

Irrespective of whether or not a chiral dopant is mixed in the n-type liquid crystal material, it is preferable that the face of each of the first and second convex members 36a and 36b that comes in contact with the liquid crystal is tilted from a direction perpendicular to the substrate plane, so as to have e.g., a trapezoidal, semicircular, or triangular cross section as shown in FIGS. 2A and 2B.

Figure 6:
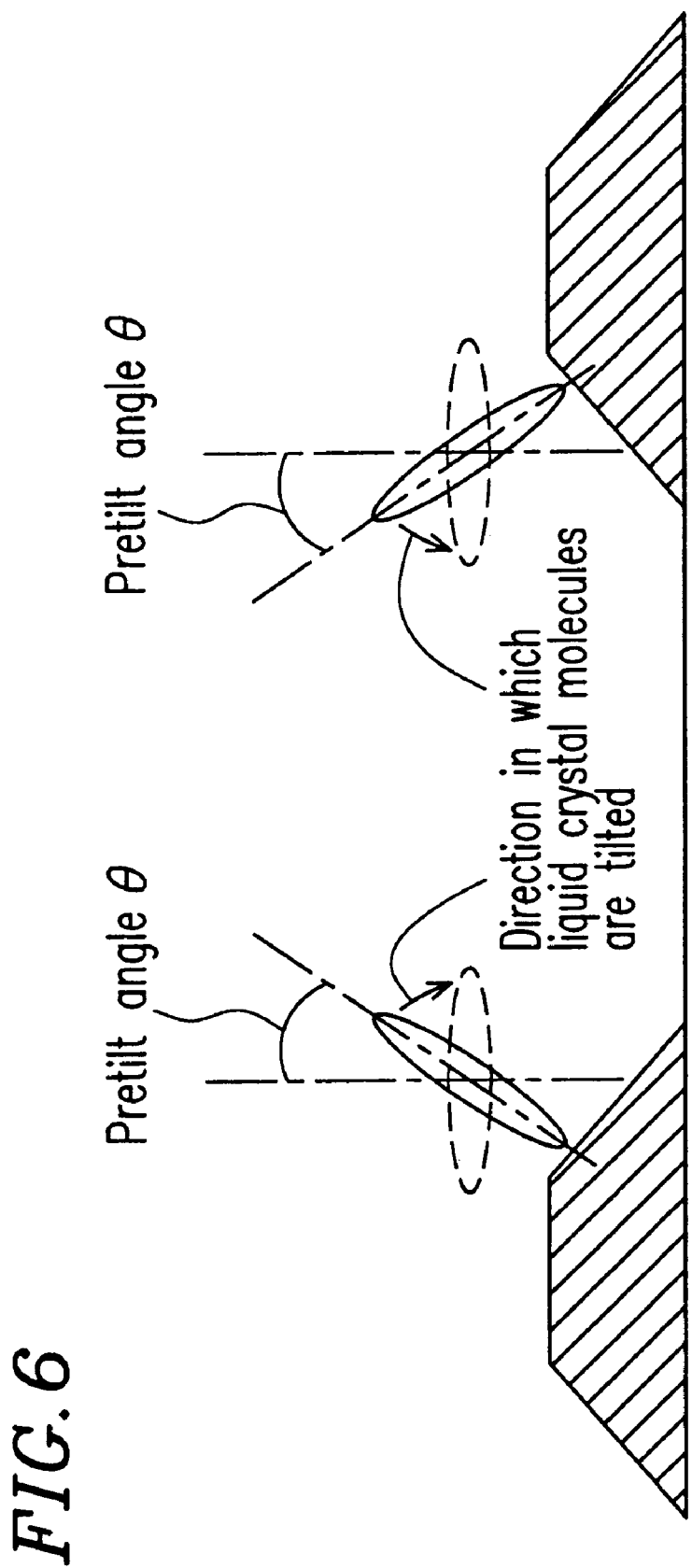
FIG. 6 is a cross-sectional view illustrating liquid crystal molecule orientations in connection with tapered faces of continuous stripes of convex members in an LCD device according to the present invention.

In the case where a chiral dopant is mixed in the n-type liquid crystal material, by ensuring that the first and second convex members 36a and 36b so as to have e.g., a trapezoidal, semicircular, or triangular cross section as mentioned above, the liquid crystal molecules 42 on the tapered faces of the first and second convex members 36a and 36b acquire a pretilt angle θ (as shown in FIG. 6) in the absence of an applied voltage. As a result, the directions of tilt of the liquid crystal molecules in the absence of an applied voltage are unified, thereby stabilizing the orientation of the liquid crystal molecules. Each liquid crystal region is defined by the latticework of wall structures (i.e., the first and second convex members 36a and 36b). In each liquid crystal region, the liquid crystal molecules are tilted from the periphery of the liquid crystal region toward the center of the liquid crystal region so that the liquid crystal molecules retain a vertical alignment in the center of the liquid crystal region. As a result, an axially symmetrical or radial orientation can substantially be attained.

Figure 7:
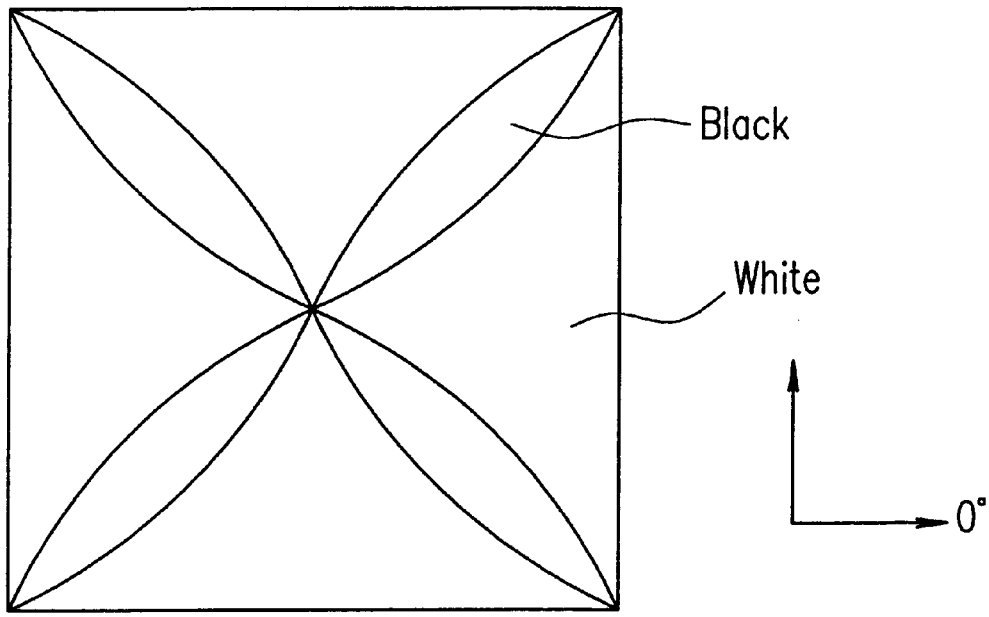
FIG. 7 illustrates an extinction pattern which appears in the case where, under an applied voltage, polarization plates held in a crossed Nicol state are placed with their absorption axes being angled at about 45° with respect to continuous stripes of convex members.

The display appears the brightest when, under an applied voltage, polarization plates held in a crossed Nicol state are placed with their absorption axes being angled at about 45° with respect to the first and second convex members 36a and 36b surrounding the pixel regions. As shown in FIG. 7, an extinction pattern appears which is in parallel to the diagonals between intersections of the continuous stripe wall structures (first and second convex members 36a and 36b) and substantially centered around the center of each pixel region.

Figure 8:
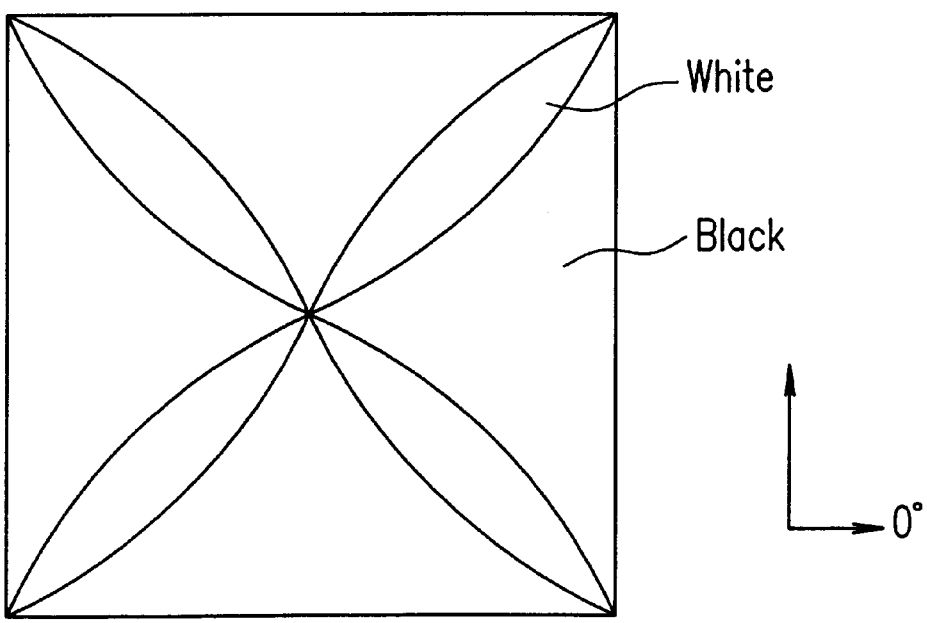
FIG. 8 illustrates an extinction pattern which appears in the case where, under an applied voltage, polarization plates held in a crossed Nicol state are placed with their absorption axes being angled in parallel to or at about 45° with respect to continuous stripes of convex members.

The display appears the darkest when, under an applied voltage, polarization plates held in a crossed Nicol state are placed with their absorption axes being angled in parallel to or at 90° with respect to the first and second convex members 36a and 36b surrounding the pixel regions. As shown in FIG. 8, an extinction pattern appears whose white and black portions are reversed from those of the extinction pattern which appears in the case where the polarization plates are placed with their absorption axes being angled at about 45° with respect to the first and second convex members 36a and 36b.

It is preferable that the tapered faces of the first and second convex members 36a and 36b are angled so that the liquid crystal molecules acquire a pretilt angle which defines a sufficient tilt from a direction perpendicular to the substrate plane under an applied voltage. A preferable range of angles of the tapered faces of the first and second convex members 36a and 36b, taken from the direction perpendicular to the substrate plane, is about 10° to about 89°, because, although such tapered faces are effective for controlling the angles of tilt of the liquid crystal molecules under an applied voltage, the inventors have confirmed through experimentation that an ASM orientation may not always be attained if the said angles of the tapered faces are below 10°. More preferably, the range of the said angles of the tapered faces of the first and second convex members 36a and 36b is about 80° to about 89°. The tapered faces of the first and second convex members 36a and 36b can be linear or curved slopes, or slopes having a gradually varying gradient.

In the case where a chiral dopant is mixed in the n-type liquid crystal material, the liquid crystal molecules are allowed to twist across the interspace between a pair of substrates under an applied voltage, and hence take an ASM orientation due to the interaction between the latticework of continuous stripe wall structures and the chiral material. Therefore, the brightness of the display remains unchanged regardless of the direction of the absorption axes of the polarization plates placed in a crossed Nicol state. In this case, too, the liquid crystal orientation can be stabilized by providing the aforementioned tapered faces of the first and second convex members 36a and 36b so as to impart the liquid crystal with sufficient pretilt angles.

Instead of a latticework of continuous stripe wall structures intersecting each other, a latticework of discontinuous stripe walls (e.g., walls extending in the form of broken or disrupted lines) intersecting each other may be employed in order to achieve an axially symmetrical or radial orientation or an ASM orientation under an applied voltage. Such convex members will have openings at the corners or have disrupted sides of the rectangular region defining each pixel region, but will provide an axially symmetrical or radial orientation due to the alignment force from the tapered faces of the convex members that causes pretilting of the liquid crystal molecules. In the case where a chiral dopant is mixed in the n-type liquid crystal material, an ASM orientation can be achieved due to the twisting force of the liquid crystal molecules provided from the chiral dopant. As a result, optical characteristics can be attained which are equivalent to the characteristics provided by employing a latticework of continuous stripe wall structures.

(Photocurable Resin)

As described above with reference to FIG. 4, it is preferable to apply a voltage which is equal to or greater than $\frac{1}{2}V_{th}$.

When a voltage is applied to liquid crystal molecules which are aligned perpendicularly with respect to the substrate plane, a plurality of central axes are formed as a transient phenomenon, because the directions in which the liquid crystal molecules are tilted are not defined uniquely. On the contrary, by applying a voltage which is equal to or greater than $\frac{1}{2}V_{th}$, a unique central axis is created within each liquid crystal region defined by the surrounding first and second convex members 36a and 36b, and this state will stably exist as long as the application of the voltage which is equal to or greater than $\frac{1}{2}V_{th}$ is continued.

In the case where the pixel regions are sized so that each side is not longer than 100 μm, the alignment stability while displaying an intermediate gray scale tone increases as the size of the pixel regions decreases, and the response speed is not influenced regardless of whether an alignment stabilization layer is provided or not. If the pixel regions have a larger size such that the pixels must be subdivided in order to enhance the response speed (which is common practice), the area occupied by the black matrix inevitably increase, thereby resulting in a lower aperture ratio. Therefore, it is preferable to provide an alignment stabilization layer for stabilization of the alignment in such cases.

Accordingly, an alignment stabilization layer can be easily formed on a surface which is in contact with the liquid crystal layer, by curing the photocurable resin which has previously been mixed in the liquid crystal material while applying a voltage which is equal to or greater than $\frac{1}{2}V_{th}$ in order to stabilize the axially symmetrical or radial orientation of the liquid crystal molecules.

Once the photocurable resin has been cured, no more than one central axis will emerge after terminating the application of the voltage which is equal to or greater than $\frac{1}{2}V_{th}$. As a result, an axially symmetrical or radial orientation can be attained with high reproducibility.

According to the present invention, an acrylate type, methacrylate type, or styrene type photocurable resin, derivatives thereof, and the like can be suitably employed, for example. By adding a photopolymerization initiator in such resins, it becomes possible to cure the photocurable resin more efficiently. Alternatively, a thermosetting resin can be employed.

The present invention provides no limitation as to the amount of curable resin to be used because it may differ from material to material. However, it is preferable that the resin content (% by weight based on the entire mixture including the liquid crystal material) is in the range of about 0.1% to about 5%. If the amount of the curable resin is below about 0.1%, the cured resin cannot sufficiently stabilize the axially symmetrical or radial orientation. If the amount of the curable resin exceeds about 5%, the effects of the vertical alignment layer are impeded so as to allow the liquid crystal molecules to deviate from their vertical alignment state; as a result, the transmittance with respect to unwanted passage of light increases so that the black state in the absence of an applied voltage deteriorates.

(Phase Plate)

When a liquid crystal material is interposed between two polarization plates which are held in a crossed Nicol state, the liquid crystal material containing liquid crystal molecules in a vertical alignment, a good black state can be observed in the frontal direction to provide high-contrast display images. However, when the displayed image is observed at various viewing angles, light leakage may be observed with: (i) viewing angle dependency due to the characteristics of the polarization plate(s) and (ii) viewing angle dependency due to the retardation within the liquid crystal layer (note that the retardation provided by liquid crystal molecules which are vertically aligned varies depending on the viewing direction). As a result, the contrast ratio may be lowered.

The above phenomenon becomes conspicuous in the direction which constitutes an azimuth angle (i.e., angle within the plane of the substrate) of about 45° from the polarization axis of a polarization plate. This phenomenon can be effectively mitigated by reducing the retardation of the liquid crystal material in a vertical alignment state.

Figure 9A:
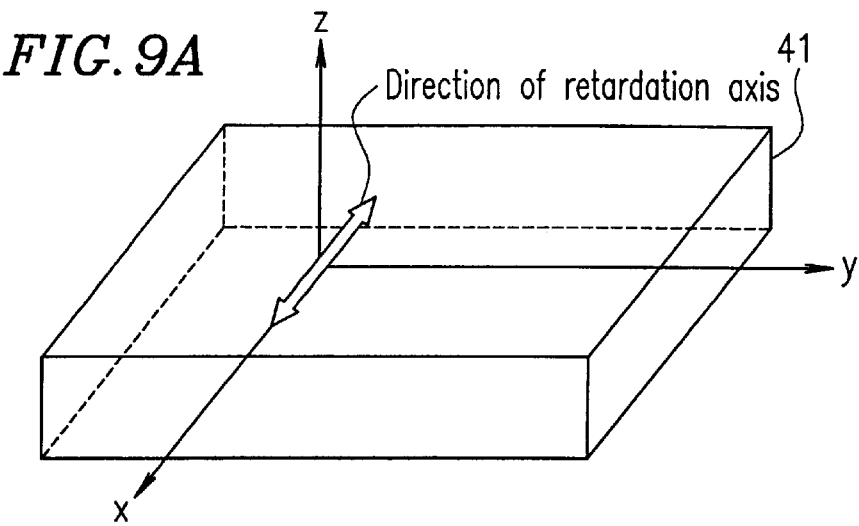
FIG. 9A is a perspective view illustrating the direction of a slower axis of a phase plate for use in the present invention.

Furthermore, it is preferable to provide a phase plate 41 between at least one of a pair of polarization plates and its adjoining substrate, the phase plate 41 containing an index ellipsoid such that (as shown in FIG. 9A) nx=ny>nz or nx>ny>nz, where nx and ny are the refractive indices in the plane of the display surface along the x direction and y direction, respectively; and nz is the refractive index along a direction perpendicular to the plane of the display surface.

Figure 9B:
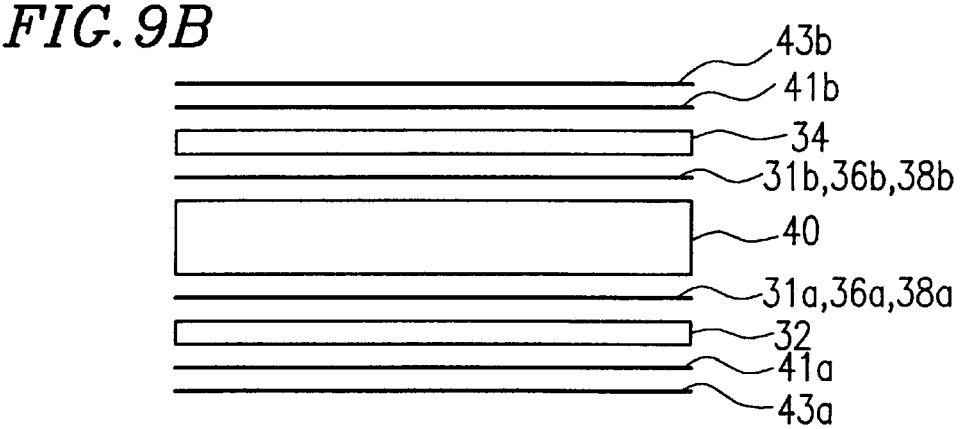
FIG. 9B is a cross-sectional view illustrating the location of various components of an LCD device.
Figure 9C:
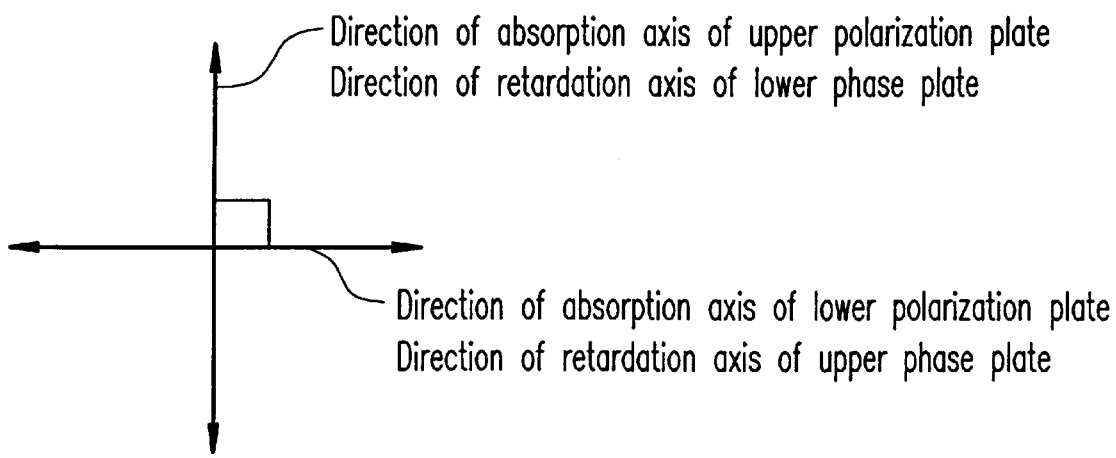
FIG. 9C is a diagram illustrating the relationship between absorption axes of polarization plates and retardation axes of phase plates.

In this case, as shown in FIG. 9C, it is preferable to dispose the phase plate so that its nx direction (slower axis) is perpendicular to the absorption axis of the adjoining polarization plate. This greatly improves the viewing angle characteristics in a direction which is about 45° from the direction of the absorption axes of polarization plates placed in a crossed Nicol state.

Alternatively, as shown in FIG. 9B, it is preferable to provide a first phase plate 41a between a first substrate 32 and a first polarization plate 43a adjoining the first substrate 32, and provide a second phase plate 41b between a second substrate 34 and a second polarization plate 43b adjoining the second substrate 34, so that the nx directions of the first phase plate 41a and the second phase plate 41b are substantially perpendicular to the absorption axes of the respectively adjoining first and second polarization plates 43a and 43b. This optimizes the effect of viewing angle compensation in the direction which is about 45° from the polarization axes of polarization plates placed in a crossed Nicol state.

The phase plate may be formed of one phase film, or of a laminate film including a plurality of phase films. Examples of materials for such phase plates include polymer materials which are transparent (i.e., having more than about 90% transmittance) in the visible spectrum, e.g., polycarbonate, polyvinyl alcohol, polystyrene, and polymethylmethacrylate (PMMA).

It is preferable that the phase difference provided by the phase plate is smaller than the inherent retardation of the liquid crystal cell, which is defined as a product of the inherent Δn of the liquid crystal material and the average thickness of the liquid crystal layer. More preferably, the phase difference provided by the phase plate is within about 30% to about 80% of the inherent retardation of the liquid crystal cell. If the phase difference provided by the phase plate is less than about 30% of the inherent retardation of the liquid crystal cell, the phase plate cannot provide a sufficient effect. If the phase difference provided by the phase plate exceeds about 80% of the inherent retardation of the liquid crystal cell, increased coloration may be observed in a broad range of viewing angles. It should be noted that a TAC (triacetylcellulose) film which is used as a support film for each polarization plate also provides some phase difference along its normal axis. Therefore, this retardation provided by the TAC film should also be considered when prescribing the aforementioned phase difference range of about 30% to about 80% of the inherent retardation of the liquid crystal cell.

Furthermore, it is preferable that the in-plane phase difference (nx−ny)df of the phase plate (where df is the thickness of the phase plate) accounts for about 3.5% to about 15% of the retardation provided by the liquid crystal layer. If the in-plane phase difference (nx−ny)df is less than about 3.5%, broad viewing angle characteristics are provided in an omnidirectional manner, but rotation symmetry results. If the in-plane phase difference (nx−ny)df exceeds 15%, satisfactory viewing angle characteristics can only be provided in a narrow range, and point symmetry is obtained.

(Vertical Alignment Layer)

Any vertical alignment can be employed whose surface causes vertical alignment of the liquid crystal molecules, whether it is made of an inorganic material or an organic material. For example, a polyimide type material such as JALS-204 (Japan Synthetic Rubber, Co., Ltd.) or 1211 (Nissan Chemical Industries, Ltd.), or an inorganic type material such as EXP-OA003 (Nissan Chemical Industries, Ltd.) can be employed.

(Polarization Plate)

By disposing polarization plates in a crossed Nicol state so as to interpose a liquid crystal material in which liquid crystal molecules are vertically aligned, it becomes possible to achieve an excellent black state in a normally black mode, thereby providing a high-contrast display. Examples of such polarization plates include: iodine type polarization films or dye-type polarization films which are obtained by adsorbing iodine and/or a hydrophilic polymer on hydrophilic polymer films (e.g., polyvinyl alcohol type films, polyvinylformal films, polyvinylacetal films, poly(ethylene-acetate) copolymer type saponified films); and polyen type polarization films which are obtained by aligning polyen by subjecting polyvinyl alcohol type films to dehydration or subjecting polyvinyl chloride films to dechlorination. Furthermore, by providing an antiglare layer on the surface of a polarization plate, the viewing angle characteristics in the direction which is about 45° from the polarization axis of each polarization plate can be further improved.

Hereinafter, the present invention will be described by way of illustrative examples which are not intended to limit the scope of the invention in any way.

EXAMPLE 1

A method for producing an LCD device according to Example 1 of the present invention will be described with reference to FIGS. 2A and 2B.

On a (first) substrate 32 having transparent electrodes (ITO: 100 nm) 31a and 32b formed thereon and a counter (or second) substrate 34, continuous stripes of first and second convex members 36a and 36b (height: about 5 μm) were formed by using photosensitive polyimide, so as to extend in regions in between and around pixel regions. Each pixel region, i.e., a region surrounded by the first and second convex members 36a and 36b, was sized at 100 μm×100 μm.

On the above composite, JALS-204 (Japan Synthetic Rubber Co., Ltd.) was spin-coated so as to form vertical alignment layers 38a and 38b.

Both substrates were attached together so that the first and second convex members 36a and 36b intersected each other, thereby forming a liquid crystal cell.

In the liquid crystal cell, an n-type liquid crystal material (Δε=−4.0; Δn=0.08; cell gap: 4 μm), in which no chiral dopant was mixed, was injected. The latticework of continuous stripes of convex members 36a and 36b made it possible to use vacuum injection for injecting the liquid crystal material because it does not completely enclose the liquid crystal regions. After the injection of the liquid crystal material, a voltage of 7 V was applied. Immediately after the voltage application, a single axially symmetrical or radial orientation was observed in each pixel region. The axially symmetrical or radial orientation did not disappear with continued voltage application.

Then, polarization plates were disposed in a crossed Nicol state on both sides of this liquid crystal cell, thereby completing the LCD device.

The resultant LCD device had substantially the same structure as that of the LCD device 100 shown in FIG. 3 (where the polarization plates are omitted) except that the first and second convex members 36a and 36b have trapezoidal cross sections as shown in FIGS. 2A and 2B.

In accordance with the LCD device of the present example, the axially symmetrical orientation is stably maintained during the application of a voltage which is equal to or greater than $½V_{th}$. When the voltage was allowed to drop below $½V_{th}$, the axially symmetrical orientation was lost so that the liquid crystal molecules returned to a state in which more than one axis was present. However, once the application of a voltage equal to or greater than $½V_{th}$ was resumed, and after passing a state where more than one central axis of axially symmetrical orientation were temporarily present within each liquid crystal region, an axially symmetrical orientation state appeared with one central axis of axially symmetrical orientation per liquid crystal region. This phenomenon was successfully reproduced twenty times out of twenty times.

The electrooptical characteristics of the LCD device of Example 1 were measured by obtaining an axially symmetrical orientation by applying a voltage equal to or greater than $½V_{th}$, which was maintained during the measurement to ensure a stable axially symmetrical orientation. The resultant electrooptical characteristics are shown in FIG. 10.

Figure 10:
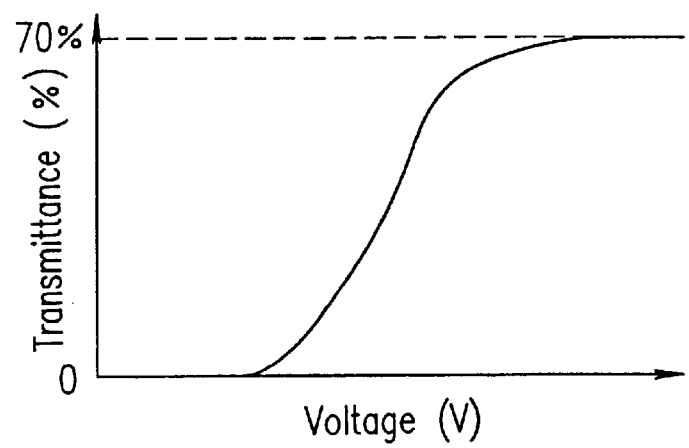
FIG. 10 is a graph illustrating the electrooptical characteristics of an LCD device according to Example 1 of the present invention.
Figure 11:
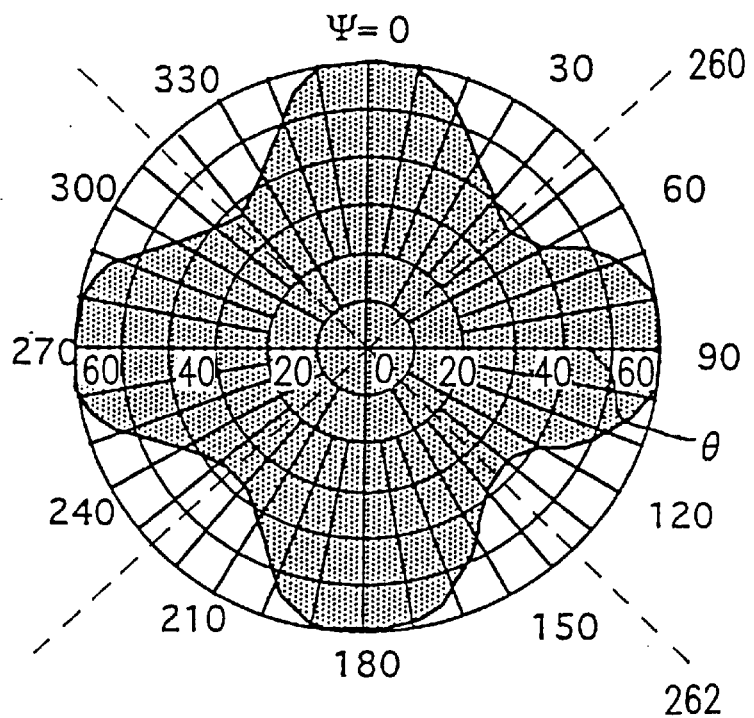
FIG. 11 is a chart illustrating the viewing angle characteristics of the LCD device according to Example 1 of the present invention.

As can be seen from FIG. 10, the LCD device according to Example 1 had a low transmittance in an OFF state, providing an excellent contrast ratio (CR=300:1.5). As for the viewing angle characteristics, a high contrast ratio was obtained in a broad range of viewing angles as shown in FIG. 11. In FIG. 11, ψ represents an azimuth angle (i.e., an angle in the plane of the display surface); θ represents a viewing angle (i.e., the angle of tilt from the normal axis of the display surface); the hatched area represents a region having a contrast ratio of 10:1 or above; reference numerals 260 and 262 each represent a direction which is 45° from the polarization axis of each polarization plate.

Although the cell thickness is retained by the intersections between the first and second continuous stripes of convex members 36a and 36b in the present example, it is also applicable to employ first and second continuous stripes of convex members 36a and 36b with lower heights and further form third convex members 63 thereupon for retaining the cell thickness as illustrated in Example 6 below. The same also applies to Examples 2 to 5.

EXAMPLE 2

Figure 12:
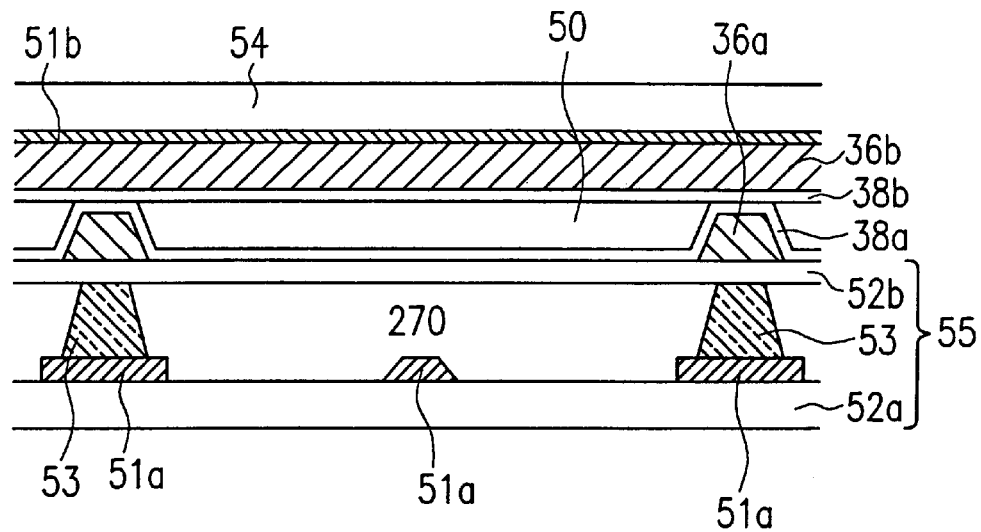
FIG. 12 is a partial cross-sectional view illustrating a pixel region of an LCD device according to Example 2 of the present invention.

According to Example 2 of the present invention, as shown in FIG. 12, a PALC (plasma address liquid crystal) substrate 55 was prepared by disposing a glass substrate 52a having plasma electrodes 51a formed thereon so as to oppose an intermediate sheet 52b (formed of glass with a thickness of about 50 μm), with an interspace provided therebetween by plasma partitions (light-shielding stripe ribs) 53, and a gas capable of plasma discharging was confined in the interspace so as to define a plasma channel 270. Continuous stripes of first convex members 36a were formed on the PALC substrate 55, and continuous stripes of second convex members 36b were formed on a CF substrate 54, on which transparent electrodes 51b of ITO were formed, so as to surround the respective pixel regions as seen from a direction perpendicular to the substrates 54 and 55.

After forming vertical alignment layers 38a and 38b on the first and second convex members 36a and 36b, respectively, both substrates were attached so that the first and second convex members 36a and 36b intersected each other, whereby a liquid crystal cell was formed.

In the empty cell, an n-type liquid crystal material ($\Delta\epsilon$=−3.2; $\Delta n$=0.08; cell gap: 4.5 μm), in which no chiral dopant was mixed, was injected, and a voltage of 70 V was applied. Immediately after the voltage application, a single axially symmetrical or radial orientation was observed in each pixel region. The axially symmetrical or radial orientation did not disappear with continued voltage application.

According to the present example, a substrate having stripe rib structures in a plasma channel, as in the case of a PALC device, is employed. In the case where the stripe rib structures are capable of shielding light, the continuous stripe wall structures (i.e., the convex members) can be produced with a predetermined thickness and in accordance with the stripe ribs by applying a positive-type photosensitive material by spin coating or the like and performing light irradiation through the PALC substrate, without the need to employ a separate mask.

EXAMPLE 3

A phase plate (retardation (nx−ny)df=10 nm; (nx−nz)df=170 nm) having an index ellipsoid in the shape of a Frisbee™ was provided on the side of each substrate facing away from the liquid crystal layer in the LCD device according to Example 1.

Figure 13:
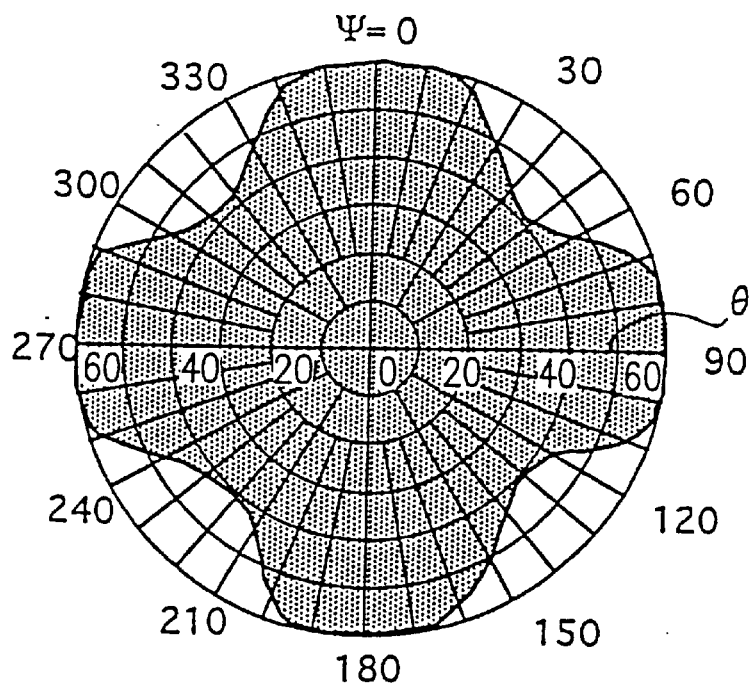
FIG. 13 is a chart illustrating the viewing angle characteristics of the LCD device according to Example 3 of the present invention.

FIG. 13 illustrates the measurement results of the viewing angle characteristics of the LCD device.

As seen from FIG. 13, the viewing angle characteristics of the LCD device according to Example 3 are further broadened as compared to the viewing angle characteristics of the LCD device according to Example 1 (FIG. 11).

Similarly broad viewing angle characteristics can also be achieved by providing a monoaxial phase film such that nx=ny; and (nx−nz)df=170 nm.

EXAMPLE 4

A computer simulation study was performed on the electrooptical characteristics of the liquid crystal cell according to Example 2 with respect to the axially symmetrical orientation mode. The computer simulation was conducted by solving the MaxWell equation by employing an algorithm (differential method).

Figure 14:
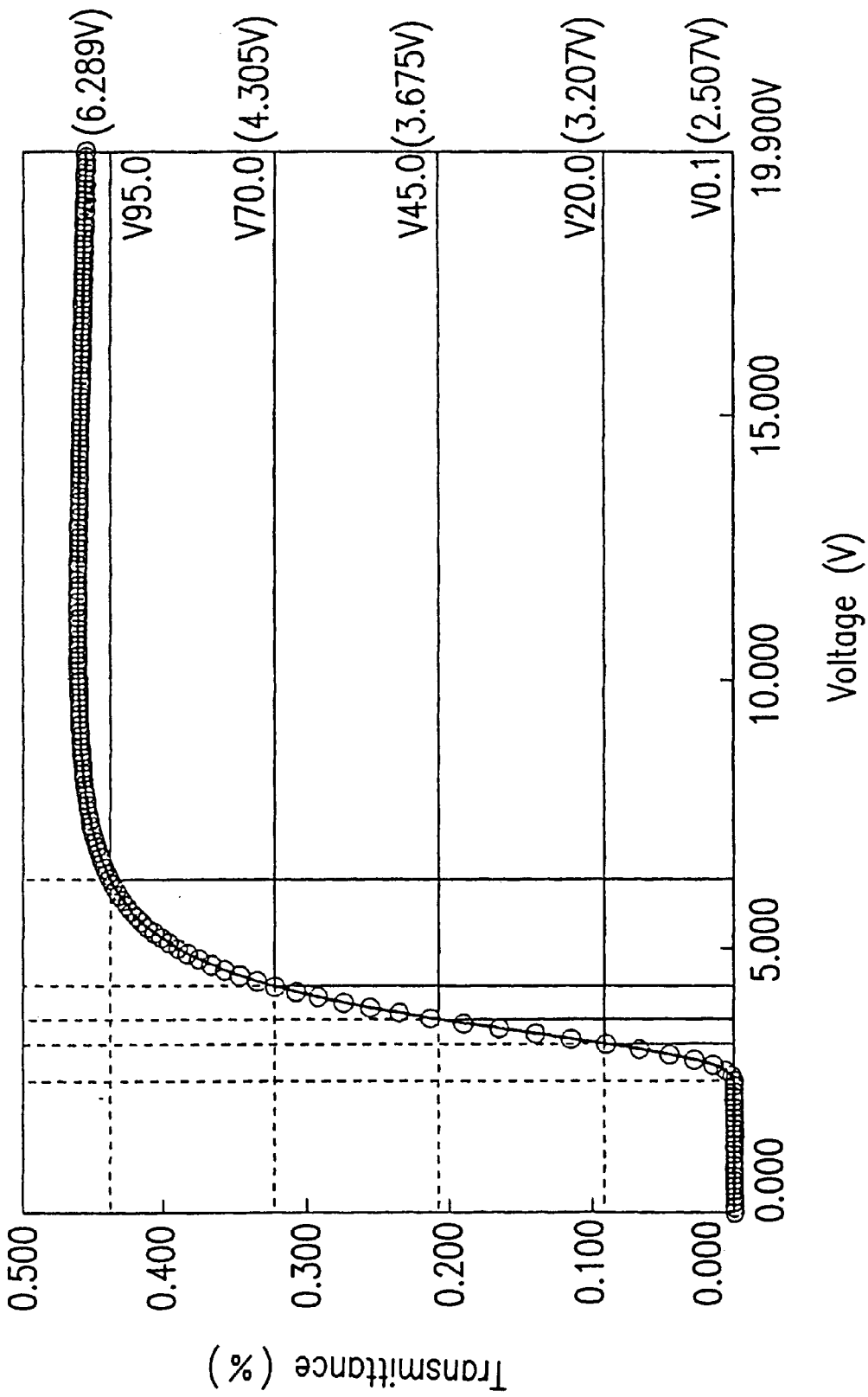
FIG. 14 is a graph illustrating a voltage-transmittance characteristic curve of an LCD device according to Example 4.
Figure 15:
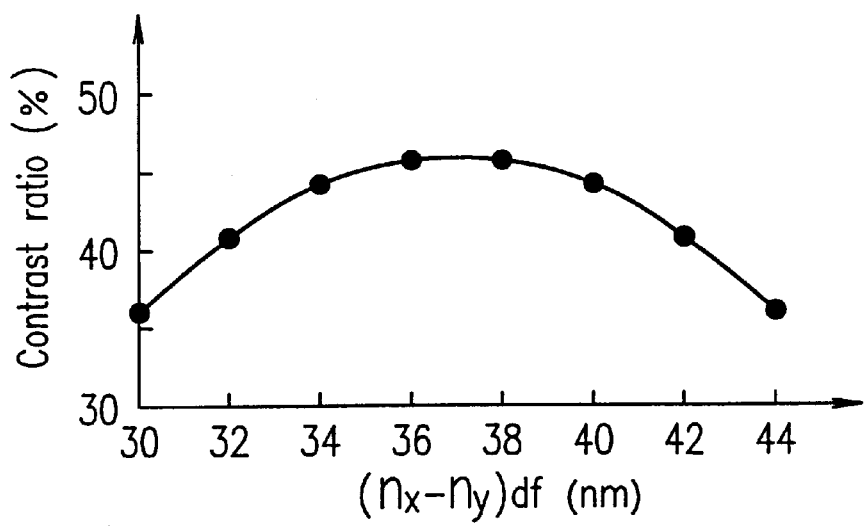
FIG. 15 is a graph illustrating the relationship between the in-plane retardation (nx−ny)df of a phase plate provided on the upper and lower faces of the liquid crystal cell and the contrast ratio under the conditions of a viewing angle of 40° and azimuth angles of 45° and 135°.

In the case where the cell thickness was prescribed at 4 μm, a steep rise in the voltage-transmittance characteristics was obtained, as seen from FIG. 14. FIG. 15 illustrates the relationship between the in-plane retardation (nx−ny)df of a phase plate provided on the upper and lower faces of the liquid crystal cell and the contrast ratio under the conditions of a viewing angle of 40° and azimuth angles of 45° and 135°. As seen from FIG. 15, it was found out that an in-plane retardation (nx−ny) of about 37 nm is optimum. On the other hand, the optimum value of the retardation along the thickness direction is about 168 nm because it is prescribed at about 4.5 times the in-plane refractive index difference (i.e., (nx−nz)df=(nx−ny)df×4.5=37.3 mm×4.5≈168 nm).

Figure 16:
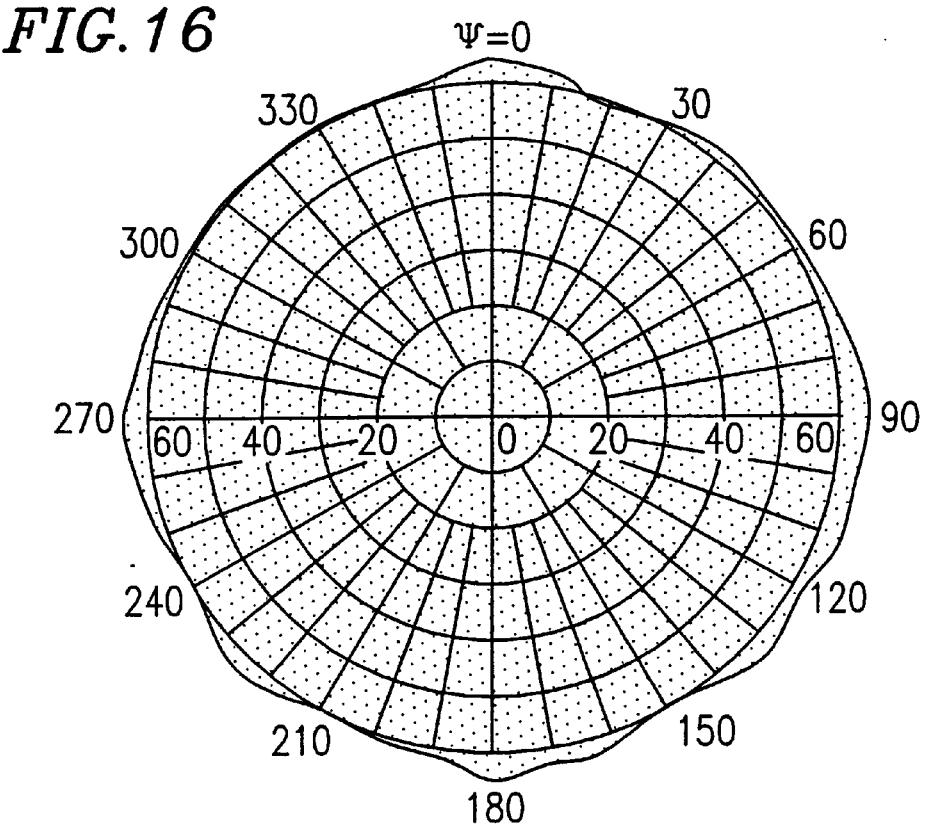
FIG. 16 is a chart illustrating the viewing angle characteristics of the LCD device according to Example 4 of the present invention.

In accordance with this LCD device, contour curves as shown in FIG. 16 were obtained, thereby realizing broad viewing angle characteristics. Furthermore, by providing a hard-coat scattering layer as an antiglare layer on the film surface of each polarization plate, the viewing angle characteristics in the direction which is about 45° from the polarization axis of each polarization plate were further improved.

Figure 17:
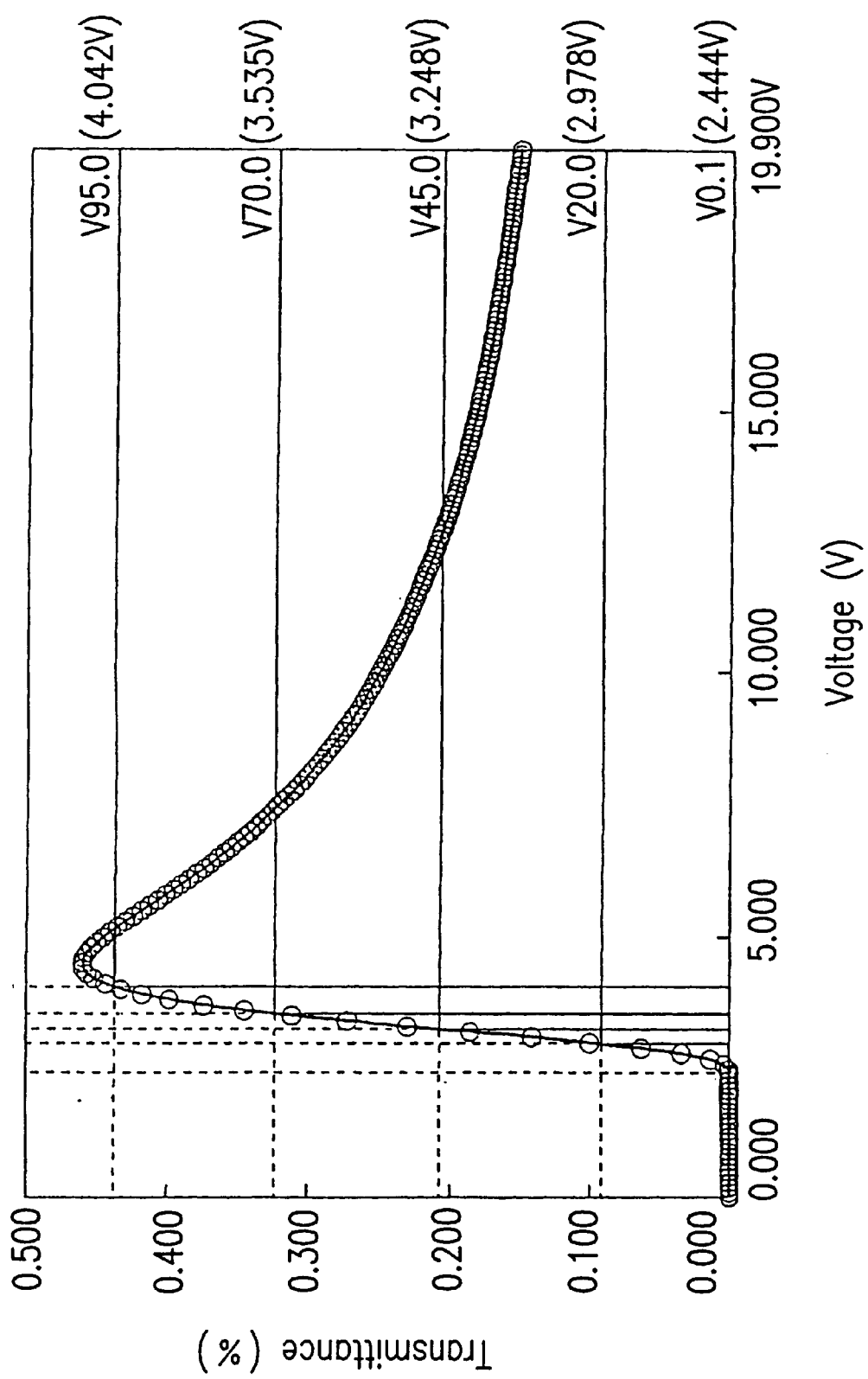
FIG. 17 is a graph illustrating a voltage-transmittance characteristic curve of another LCD device according to Example 4.
Figure 18:
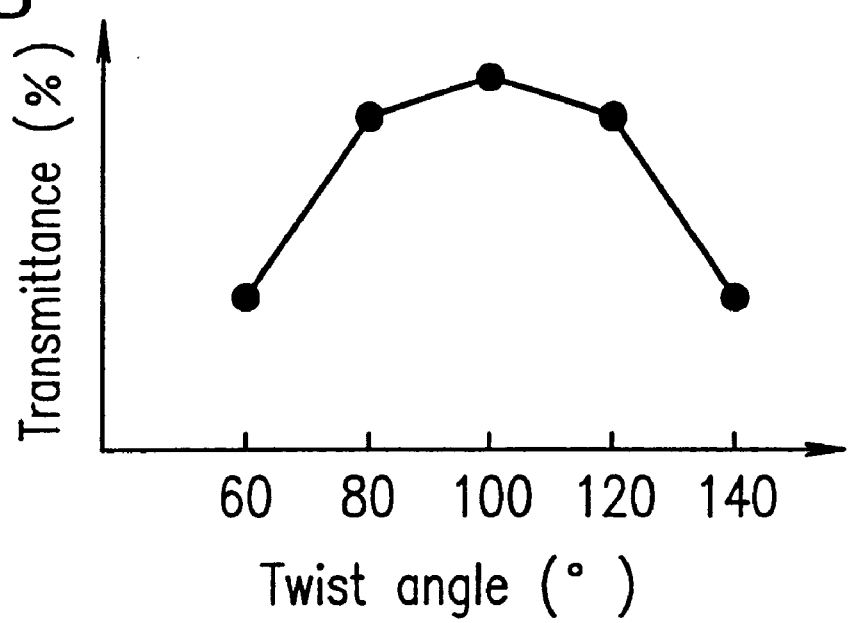
FIG. 18 is a graph illustrating the relationship between twist angles and the transmittance characteristics under an applied voltage of an LCD device according to Example 5 of the present invention.
Figure 19A:
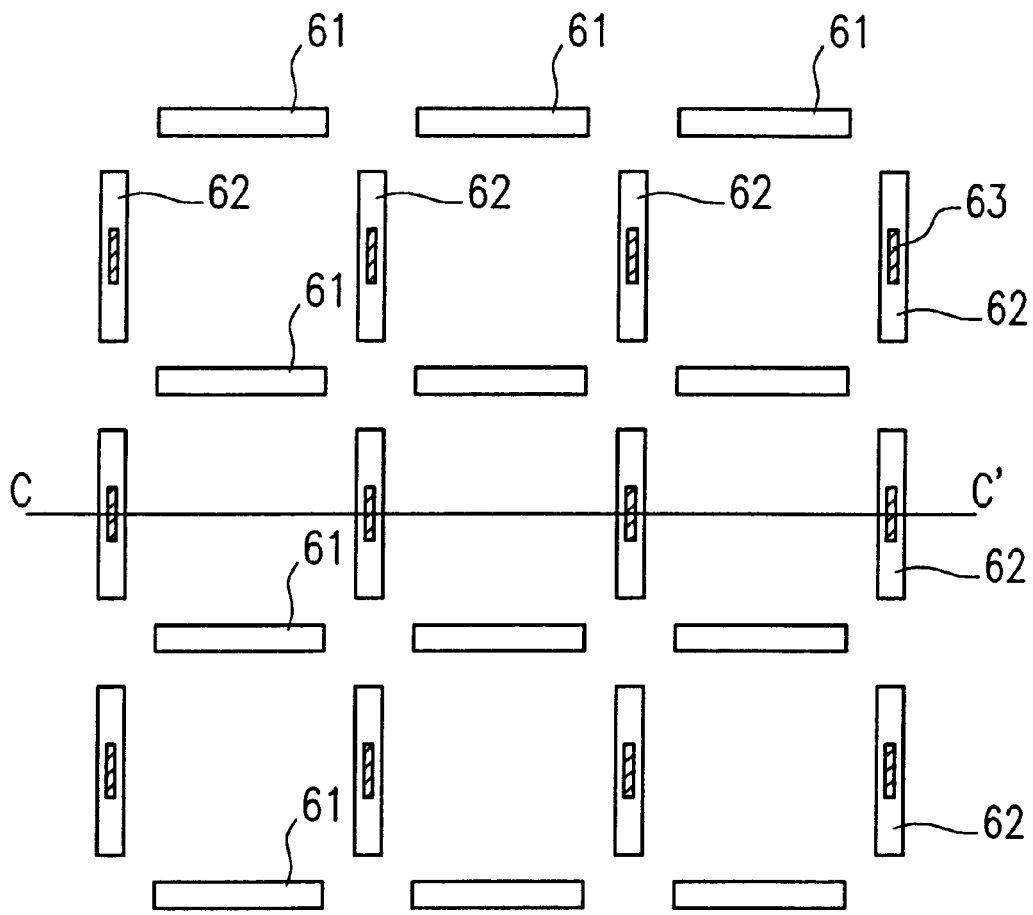
FIG. 19A is a plan view illustrating convex members in the form of broken or disrupted lines employed in an LCD device according to Example 6 of the present invention.
Figure 19B:
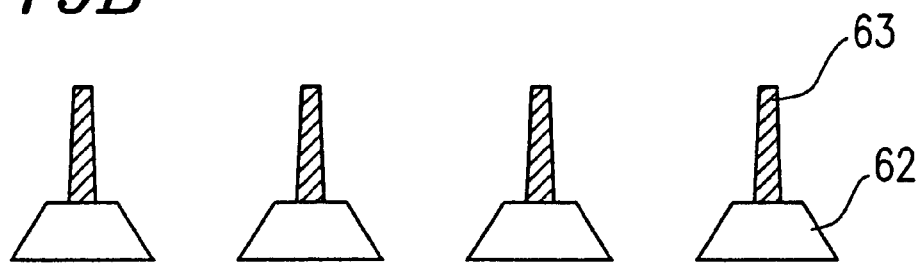
FIG. 19B is a cross-sectional view taken along line C–C' in FIG. 19A.
Figure 20:
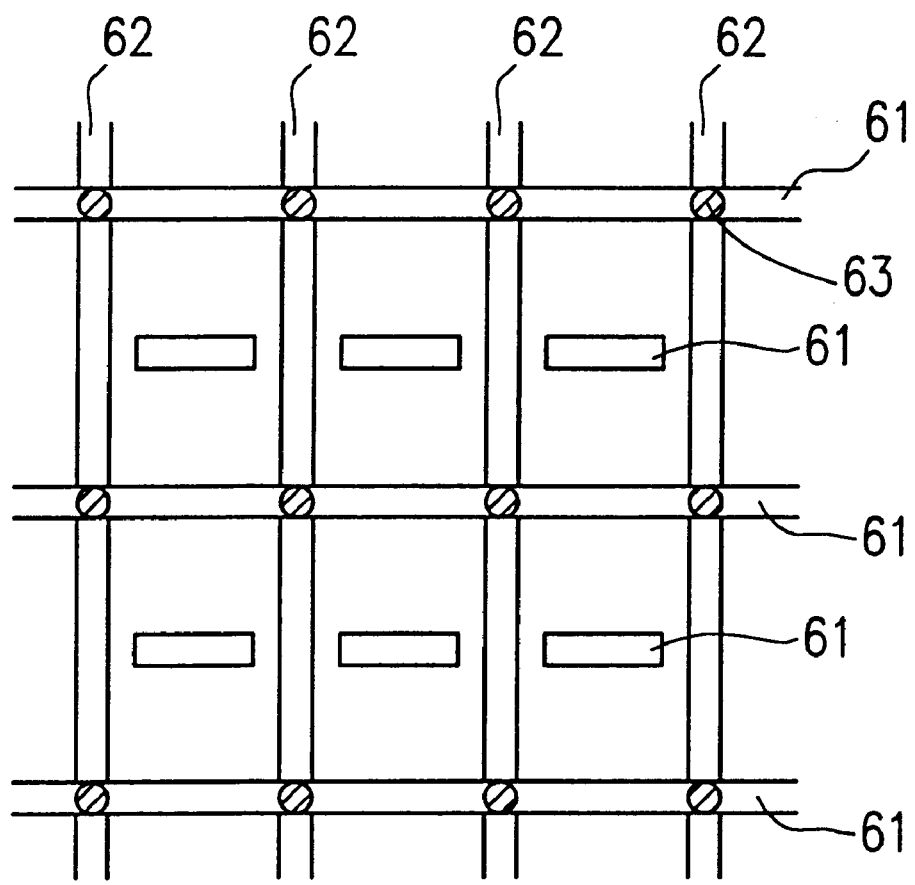
FIG. 20 is a plan view illustrating convex members in the form of broken or disrupted lines employed in an LCD device according to Example 6 of the present invention.
Figure 21:
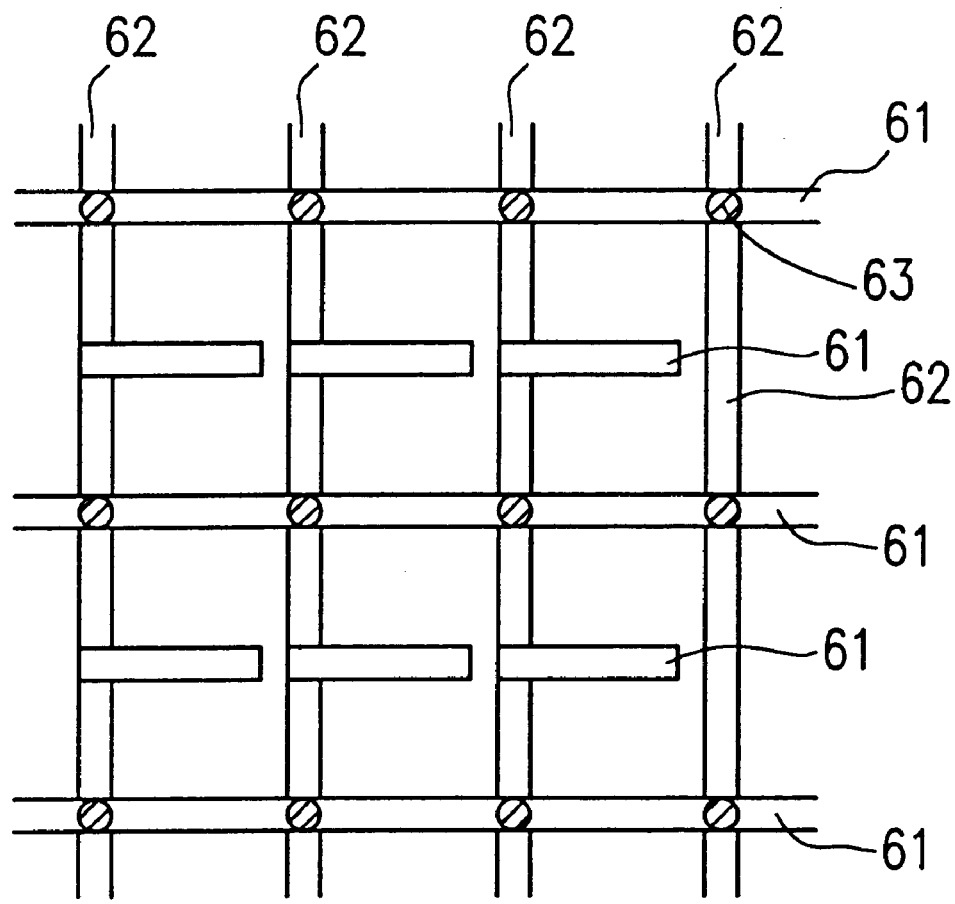
FIG. 21 is a plan view illustrating convex members in the form of broken or disrupted lines employed in an LCD device according to Example 6 of the present invention.
Figure 22:
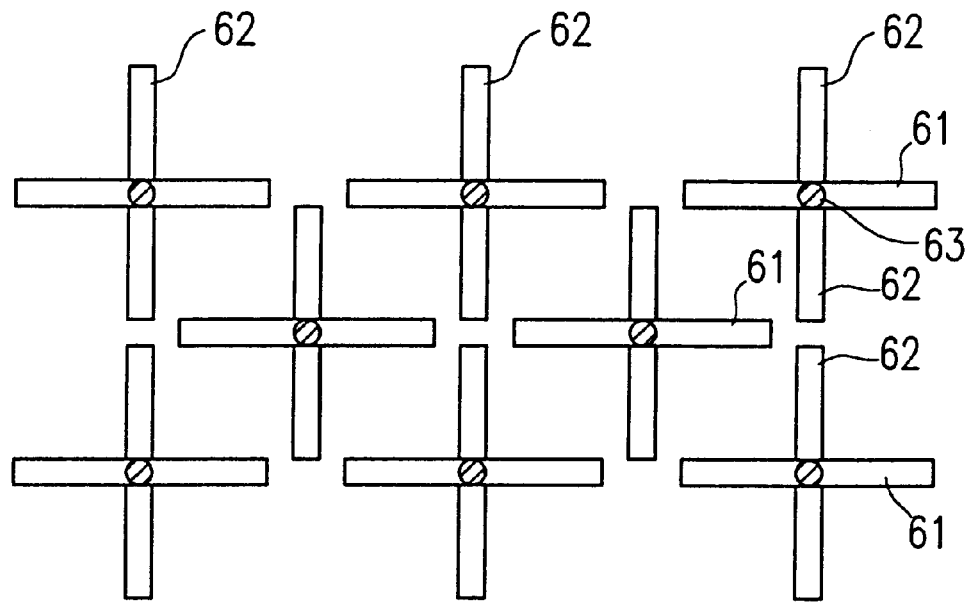
FIG. 22 is a plan view illustrating convex members in the form of broken or disrupted lines employed in an LCD device according to Example 6 of the present invention.
Figure 23:
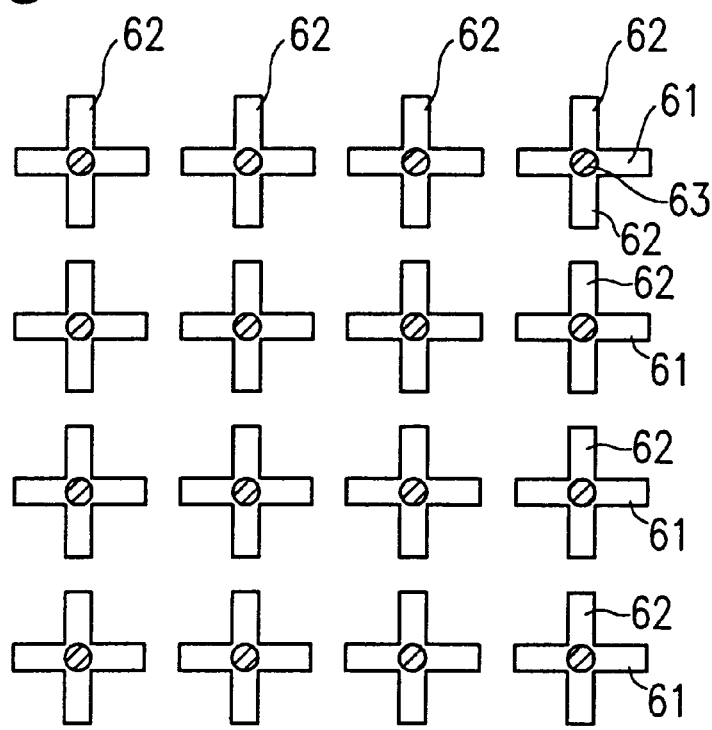
FIG. 23 is a plan view illustrating convex members in the form of broken or disrupted lines employed in an LCD device according to Example 6 of the present invention.

In the case where the cell thickness was prescribed at 6 μm, the voltage-transmittance characteristics as shown in FIG. 17 were obtained, which were not satisfactory for display purposes.

EXAMPLE 5

According to Example 5 of the present invention, an n-type liquid crystal material ($\Delta\epsilon$=−4.0; $\Delta n$=0.08; cell gap: 4 μm), in which a chiral dopant was mixed, was injected into the liquid crystal cell according to Example 1, and a voltage of 7 V was applied. Immediately after the voltage application, more than one region of axially symmetrical orientation (ASM orientation) were observed in each pixel region. With continued voltage application, one axially symmetrical orientation domain (monodomain) appeared in each liquid crystal region.

By providing a phase film similar to that described in Example 4 in this LCD device, broad viewing angle characteristics similar to those obtained in Example 4 were realized.

In order to stabilize the orientation with voltage switching, it is preferable to, for example, mix a photocurable resin in the liquid crystal material and cure the photocurable resin by irradiating light while applying a voltage which is equal to or greater than ½$V_{th}$.

In the case of mixing a chiral material, the twist angle is preferably in the range of about 80° to about 120°. Within this range of twist angles, excellent voltage-transmittance characteristics were obtained in an omnidirectional manner. Viewing angle characteristics and color characteristics were also excellent in an omnidirectional manner.

EXAMPLE 6

According to Example 6 of the present invention, instead of employing a completely continuous latticework of structures, discontinuous convex members (e.g., walls extending in the form of broken or disrupted lines) were combined into a latticework having openings at the corners or having disrupted sides of the rectangular region defining each pixel region.

As shown in FIGS. 19A and 19B to 23, first convex members 61 in the form of broken or disrupted lines were formed on a first substrate so as to extend in parallel to one another along a first direction, and second convex members 62 in the form of broken or disrupted lines were formed on a second substrate along a second direction so as to extend in parallel to one another. Furthermore, third convex members 63 for controlling the cell thickness at predetermined intervals were provided on the first convex members 61 on the first substrate.

Thereafter, vertical alignment layers were formed on both substrates. Then, the substrates were attached to each other so that the first convex members 61 partially overlapped the second convex members 62 as viewed in a direction perpendicular to the substrate plane. Thus, convex structures having openings at the corners or disrupted sides were formed at positions on the substrate plane lying outside the pixel regions. A liquid crystal cell was formed by injecting an n-type liquid crystal material containing a chiral dopant into an interspace between the substrates. Then, polarization plates were disposed in a crossed Nicol state on both sides of this liquid crystal cell, thereby completing the LCD device.

In the present example where disrupted stripes of convex members are employed, this LCD device exhibited an axially symmetrical or an ASM orientation as shown in FIG. 3B (in the absence of an applied voltage) or FIG. 3D (under an applied voltage), as in the case where continuous stripes of convex members are formed.

In the case where tapered faces were provided on the first and second convex members 61 and 62, injecting an n-type liquid crystal material containing no chiral dopant resulted in an axially symmetrical or radial orientation.

According to the present example, the first convex members have a height which is lower than the cell thickness, so that the cell thickness is controlled by the heights of the first and third convex members from the pixel regions. As a result, the injection of the material is facilitated.

In the case where the first and second convex members on the respective substrates intersect each other, the cell thickness can be controlled at the intersections between the first and second convex members, and the third convex members can be omitted.

In the case of where the LCD device employs a PALC device, convex members in the form of disrupted or broken lines can be formed on a color filter.

COMPARATIVE EXAMPLE

Figure 24:
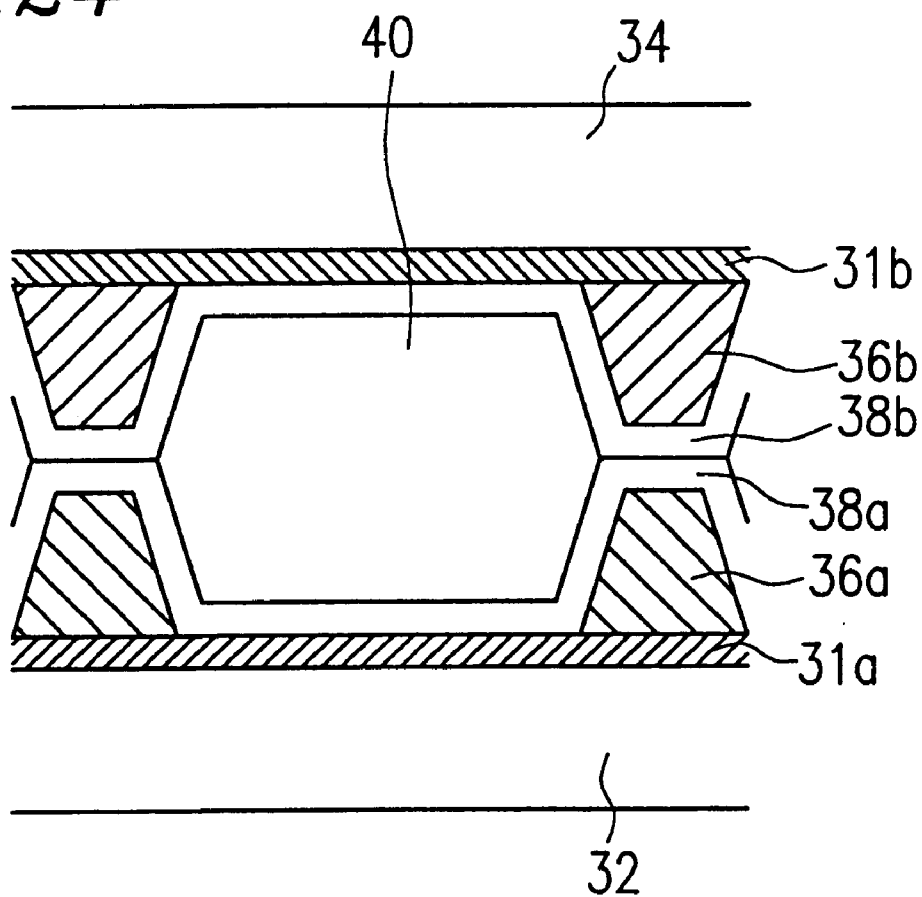
FIG. 24 is a partial cross-sectional view illustrating pixel regions of an LCD device of a comparative example.

As a comparative example, a liquid crystal cell was formed by attaching substrates 32 and 34 so that convex members 36a formed on the substrate 32 extended in parallel to convex members 36b formed on the substrate 34, as shown in FIG. 24.

Injecting the same material as that described in Example 1 into this liquid crystal cell resulted in a random orientation of liquid crystal molecules, and random disclination lines were formed.

Then, polarization plates were disposed in a crossed Nicol state on both sides of this liquid crystal cell, thereby completing the LCD device.

An observation of this LCD device during a voltage application revealed intermediate gray scale images with some unevenness.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising:

a first substrate and a second substrate;

a liquid crystal layer interposed between the first substrate and the second substrate, the liquid crystal layer comprising liquid crystal molecules having a negative dielectric anisotropy;

a plurality of first convex members formed on the first substrate along a first direction; and a plurality of second convex members formed on the second substrate along a second direction which is different from the first direction, the plurality of first convex members partially overlapping the plurality of second convex members, the plurality of first convex members and the plurality of second convex members defining liquid crystal regions, and wherein, under an applied voltage, the liquid crystal molecules in each liquid crystal region are aligned in an axially symmetrical or radial orientation; and wherein, in the absence of an applied voltage, the liquid crystal molecules in each liquid crystal region are aligned substantially perpendicularly to the first substrate and the second substrate.

2. A liquid crystal display device according to claim 1, wherein the plurality of first convex members and the plurality of second convex members are formed in continuous stripes.

3. A liquid crystal display device according to claim 1, wherein the plurality of first convex members and the plurality of second convex members are formed in disrupted stripes.

4. A liquid crystal display device according to claim 1, wherein the liquid crystal layer has a thickness ($d_{in}$) within the liquid crystal regions and a thickness ($d_{out}$) in between or around the liquid crystal regions, the thickness ($d_{in}$) being larger than the thickness ($d_{out}$) and a vertical alignment layer is provided on a side of at least one of the first substrate and the second substrate facing the liquid crystal layer.

5. A liquid crystal display device according to claim 1, wherein the plurality of first convex members have substantially the same height with one another, and the plurality of second convex members have substantially the same height with one another; and wherein an interspace between the first substrate and the second substrate is retained by intersections between the plurality of first convex members and the plurality of second convex members.

6. A liquid crystal display device according to claim 1, wherein no chiral dopant is mixed in the liquid crystal layer; and wherein at least one convex member among the plurality of first convex members and the plurality of second convex members has a face tilted with respect to a direction perpendicular to the substrate plane.

7. A liquid crystal display device according to claim 1, wherein a chiral dopant is mixed in the liquid crystal layer.

8. A liquid crystal display device according to claim 7, wherein the liquid crystal molecules in the liquid crystal layer have twist angles in the range of about 80° to about 120°.

9. A liquid crystal display device according to claim 1, wherein Δn×d is in the range of about 300 to about 550 nm, where Δn is a refractive index anisotropy of the liquid crystal molecules, and d is a thickness of the liquid crystal layer.

10. A liquid crystal display device according to claim 1, wherein a first polarization plate is provided on a side of the first substrate opposite the side facing the liquid crystal layer, and a second polarization plate is provided on a side of the second substrate opposite the side facing the liquid crystal layer, the first polarization plate and the second polarization plate being placed in a crossed Nicol state; and
wherein a first phase plate is provided between the first polarization plate and the first substrate, the first phase plate having in-plane primary refractive indices nx and ny and a primary refractive index nz along a thickness direction, where nx, ny, and nz satisfy the relationship nx>ny>nz or the relationship nx=ny>nz.

11. A liquid crystal display device according to claim 10, wherein a direction of the in-plane primary refractive index nx of the first phase plate is substantially perpendicular to an absorption axis of the first polarization plate.

12. A liquid crystal display device according to claim 10, wherein a second phase plate is provided between the second polarization plate and the second substrate; and
wherein a direction of the in-plane primary refractive index nx of the first phase plate is substantially perpendicular to an absorption axis of the first polarization plate, and a direction of the in-plane primary refractive index nx of the second phase plate is substantially perpendicular to an absorption axis of the second polarization plate.

13. A liquid crystal display device according to claim 1, wherein an alignment stabilization layer is further provided on the side of at least one of the first substrate and the second substrate facing the liquid crystal layer, the alignment stabilization layer imparting the liquid crystal molecules with pretilt angles for causing axially symmetrical or radial orientation of the liquid crystal molecules.

14. A liquid crystal display device according to claim 13, wherein the alignment stabilization layer comprises a photocurable resin.

15. A method for producing a liquid crystal display device, comprising the steps of:
forming a plurality of first convex members on a first substrate along a first direction, a plurality of second convex members on a second substrate along a second direction which is different from the first direction, and a vertical alignment layer on a side of at least one of the first substrate and the second substrate facing the liquid crystal layer;
attaching the first substrate and the second substrate to each other so that the plurality of first convex members partially overlap the plurality of second convex members;
interposing a liquid crystal layer between the first substrate and the second substrate, the liquid crystal layer comprising liquid crystal molecules having a negative dielectric anisotropy; and
aligning the liquid crystal molecules in liquid crystal regions defined by the plurality of first convex members and the plurality of second convex members in an axially symmetrical or radial orientation while applying a voltage which is equal to or greater than ½ of a threshold voltage of voltage-transmittance characteristics of the liquid crystal display device.

16. A method for producing a liquid crystal display device according to claim 15,
wherein the plurality of first convex members and the plurality of second convex members are formed in continuous stripes.

17. A method for producing a liquid crystal display device according to claim 15,
wherein the plurality of first convex members and the plurality of second convex members are formed in disrupted stripes.

18. A method for producing a liquid crystal display device according to claim 15,
wherein the liquid crystal material comprises a photocurable resin, the method further comprising the step of:
curing the photocurable resin to form an alignment stabilization layer on a side of at least one of the first substrate and the second substrate facing the liquid crystal layer, the alignment stabilization layer imparting the liquid crystal molecules with pretilt angles for causing axially symmetrical or radial orientation of the liquid crystal molecules.

19. A method for producing a liquid crystal display device according to claim 15, wherein the step of interposing the liquid crystal material is performed by vacuum injection.

* * * * *